(12) United States Patent
Bakalash et al.

(10) Patent No.: US 11,508,114 B2
(45) Date of Patent: *Nov. 22, 2022

(54) DISTRIBUTED ACCELERATION STRUCTURES FOR RAY TRACING

(71) Applicant: ADSHIR LTD., Tel Aviv (IL)

(72) Inventors: Reuven Bakalash, Shdema (IL); Elad Haviv, Tsurit (IL)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/327,690

(22) Filed: May 22, 2021

(65) Prior Publication Data

US 2021/0279941 A1 Sep. 9, 2021

Related U.S. Application Data

(63) Continuation of application No. 17/019,274, filed on Sep. 13, 2020, now Pat. No. 11,017,583, which is a (Continued)

(51) Int. Cl.
| | |
|---|---|
| *G06T 15/06* | (2011.01) |
| *G06T 15/00* | (2011.01) |
| *G06T 11/00* | (2006.01) |
| *G06T 15/50* | (2011.01) |
| *G06T 1/20* | (2006.01) |
| *G06T 19/00* | (2011.01) |
| *G06T 7/60* | (2017.01) |
| *G06T 1/60* | (2006.01) |
| *G06T 15/04* | (2011.01) |

(52) U.S. Cl.
CPC ............. *G06T 15/06* (2013.01); *G06T 1/20* (2013.01); *G06T 1/60* (2013.01); *G06T 7/60* (2013.01); *G06T 11/001* (2013.01); *G06T 15/005* (2013.01); *G06T 15/04* (2013.01); *G06T 15/506* (2013.01); *G06T 19/006* (2013.01); *G06T 2215/16* (2013.01)

(58) Field of Classification Search
None
See application file for complete search history.

(56) References Cited

U.S. PATENT DOCUMENTS

| | | |
|---|---|---|
| 5,442,733 A | 8/1995 | Kaufman et al. |
| 5,907,691 A | 5/1999 | Faget et al. |

(Continued)

FOREIGN PATENT DOCUMENTS

WO 2015/192117 A1 12/2015

OTHER PUBLICATIONS

Wald et al., Interactive Rendering with Coherent Ray Tracing, Computer Graphics Forum, vol. 20, Sep. 2001, pp. 153-165.

(Continued)

*Primary Examiner* — Jason A Pringle-Parker
(74) *Attorney, Agent, or Firm* — Schwegman Lundberg & Woessner, P.A.

(57) ABSTRACT

A path tracing system in which the traversal task is distributed between one global acceleration structure, which is central in the system, and multiple local acceleration structures, distributed among cells, of high locality and of autonomous processing. Accordingly, the centrality of the critical resource of accelerating structure is reduced, lessening bottlenecks, while improving parallelism.

20 Claims, 23 Drawing Sheets

Related U.S. Application Data continuation of application No. 16/788,845, filed on Feb. 12, 2020, now Pat. No. 10,818,072, which is a continuation of application No. 16/444,431, filed on Jun. 18, 2019, now Pat. No. 10,614,614, which is a continuation of application No. 15/984,359, filed on May 20, 2018, now Pat. No. 10,380,785, which is a continuation of application No. 15/376,580, filed on Dec. 12, 2016, now abandoned, which is a continuation-in-part of application No. 15/009,442, filed on Jan. 28, 2016, now Pat. No. 9,741,160, which is a continuation-in-part of application No. 14/868,461, filed on Sep. 29, 2015, now Pat. No. 9,558,530.

(60) Provisional application No. 62/408,730, filed on Oct. 15, 2016, provisional application No. 62/354,755, filed on Jun. 26, 2016, provisional application No. 62/289,927, filed on Feb. 2, 2016, provisional application No. 62/266,584, filed on Dec. 12, 2015.

(56) References Cited

U.S. PATENT DOCUMENTS

| Patent/Pub No. | Date | Inventor |
|---|---|---|
| 6,359,618 B1 | 3/2002 | Heirich |
| 6,512,517 B1 | 1/2003 | Knittel et al. |
| 6,621,925 B1 | 9/2003 | Ohmori et al. |
| 6,911,984 B2 | 6/2005 | Sabella |
| 6,967,663 B1 | 11/2005 | Bastos |
| 7,212,207 B2 | 5/2007 | Green et al. |
| 7,561,163 B1 | 7/2009 | Johnson |
| 9,424,685 B2 | 8/2016 | Howson |
| 9,483,865 B2 | 11/2016 | Bakalash |
| 9,558,530 B2 | 1/2017 | Bakalash |
| 9,576,389 B2 | 2/2017 | Lee |
| 9,607,426 B1 | 3/2017 | Peterson |
| 9,672,654 B2 | 6/2017 | Shin |
| 9,697,640 B2 | 7/2017 | Obert |
| 9,741,160 B2 | 8/2017 | Bakalash |
| 10,204,442 B2 | 2/2019 | Bakalash et al. |
| 10,217,268 B2 | 2/2019 | Bakalash et al. |
| 10,229,527 B2 | 3/2019 | Bakalash et al. |
| 10,297,068 B2 | 5/2019 | Bakalash et al. |
| 10,332,304 B1 | 6/2019 | Bakalash |
| 10,380,785 B2 | 8/2019 | Bakalash et al. |
| 10,395,415 B2 | 8/2019 | Bakalash |
| 10,395,416 B2 | 8/2019 | Bakalash |
| 10,403,027 B2 | 9/2019 | Bakalash et al. |
| 10,410,401 B1 | 9/2019 | Bakalash et al. |
| 10,565,776 B2 | 2/2020 | Bakalash |
| 10,614,614 B2 | 4/2020 | Bakalash |
| 10,699,468 B2 | 6/2020 | Bakalash et al. |
| 10,789,759 B2 | 9/2020 | Bakalash et al. |
| 10,818,072 B2 | 10/2020 | Bakalash et al. |
| 10,950,030 B2 | 3/2021 | Bakalash et al. |
| 11,017,582 B2 | 5/2021 | Bakalash et al. |
| 11,017,583 B2 | 5/2021 | Bakalash et al. |
| 11,302,058 B2 | 4/2022 | Bakalash et al. |
| 2007/0257911 A1 | 11/2007 | Bavoil et al. |
| 2008/0088622 A1 | 4/2008 | Shearer |
| 2008/0100617 A1 | 5/2008 | Keller et al. |
| 2008/0231627 A1 | 9/2008 | Shearer |
| 2009/0073167 A1 | 3/2009 | Brown |
| 2009/0073187 A1 | 3/2009 | Rampson et al. |
| 2009/0102844 A1 | 4/2009 | Deparis |
| 2009/0128552 A1 | 5/2009 | Fujiki |
| 2009/0128562 A1 | 5/2009 | McCombe |
| 2009/0167763 A1 | 7/2009 | Waechter |
| 2009/0213115 A1 | 8/2009 | Keller |
| 2010/0053162 A1 | 3/2010 | Dammertz |
| 2010/0060637 A1 | 3/2010 | Shearer |
| 2010/0079457 A1 | 4/2010 | Tavenrath |
| 2010/0239185 A1 | 9/2010 | Fowler et al. |
| 2011/0066682 A1 | 3/2011 | Aldunate |
| 2012/0069023 A1 | 3/2012 | Hur |
| 2012/0213430 A1 | 8/2012 | Nutter |
| 2013/0120385 A1 | 5/2013 | Krishnaswamy |
| 2013/0190602 A1 | 7/2013 | Liao |
| 2014/0049539 A1 | 2/2014 | Lee |
| 2014/0078143 A1 | 3/2014 | Lee |
| 2014/0375641 A1 | 12/2014 | Bakalash |
| 2014/0375645 A1 | 12/2014 | Bakalash |
| 2015/0042655 A1 | 2/2015 | Gautron et al. |
| 2015/0109302 A1 | 4/2015 | Lee |
| 2015/0172641 A1 | 6/2015 | Nakamura |
| 2016/0005209 A1 | 1/2016 | Dachsbacher |
| 2016/0019672 A1 | 1/2016 | Bakalash |
| 2016/0027204 A1 | 1/2016 | Lee |
| 2016/0055608 A1 | 2/2016 | Frascati |
| 2016/0155258 A1 | 6/2016 | Bakalash |
| 2016/0284118 A1 | 9/2016 | Howson |
| 2017/0061674 A1 | 3/2017 | Lee |
| 2017/0103567 A1 | 4/2017 | Peterson |
| 2017/0109931 A1 | 4/2017 | Knorr |
| 2017/0178398 A1 | 6/2017 | Afra |
| 2017/0236247 A1 | 8/2017 | Akenine-Moller |
| 2017/0236325 A1 | 8/2017 | Lecocq |
| 2017/0372508 A1 | 12/2017 | Schoeneman |
| 2018/0350128 A1 | 12/2018 | Bakalash et al. |
| 2018/0365880 A1 | 12/2018 | Bakalash et al. |
| 2018/0374255 A1 | 12/2018 | Bakalash et al. |
| 2018/0374256 A1 | 12/2018 | Bakalash et al. |
| 2018/0374257 A1 | 12/2018 | Bakalash et al. |
| 2019/0057544 A1 | 2/2019 | Lecocq |
| 2019/0147637 A1 | 5/2019 | Bakalash et al. |
| 2019/0180496 A1 | 6/2019 | Bakalash |
| 2019/0180497 A1 | 6/2019 | Bakalash |
| 2019/0188897 A1 | 6/2019 | Bakalash |
| 2019/0304162 A1 | 10/2019 | Bakalash |
| 2019/0304163 A1 | 10/2019 | Bakalash |
| 2020/0058155 A1 | 2/2020 | Bakalash et al. |
| 2020/0143581 A1 | 5/2020 | Bakalash et al. |
| 2020/0175743 A1 | 6/2020 | Bakalash et al. |
| 2020/0320773 A1 | 10/2020 | Bakalash et al. |
| 2020/0380764 A1 | 12/2020 | Bakalash et al. |
| 2020/0410744 A1 | 12/2020 | Bakalash et al. |
| 2021/0201560 A1 | 7/2021 | Bakalash et al. |
| 2022/0198740 A1 | 6/2022 | Bakalash et al. |

OTHER PUBLICATIONS

Hanraman et al., Ray Tracing on Programmable Graphics Hardware, ACM Siggraph 2001 Proceedings, pp. 703-712.

Parker et al., OptiX: A general purpose ray tracing engine, Journal ACM Transactions on Graphics—Proceedings of ACM Siggraph 2010, vol. 29, issued on Jul. 4, 2010, Article No. 86.

Wald et al., Realtime Ray Tracing and its use for Interactive Global Illumination, Proceedings of Eurographics 2003.

Wald et al., Ray Tracing Animated Scenes using Coherent Grid Traversal, ACM 2006.

Broecker, Markus, Bruce H. Thomas, and Ross T. Smith, "Adapting ray tracing to spatial augmented reality", 2013 IEEE International Symposium on Mixed and Augmented Reality (ISMAR), IEEE, 2013.

Kan, Peter, and Hannes Kaufmann, "Differential irradiance caching for fast high-quality light transport between virtual and real worlds", 2013 IEEE International on Mixed and Augmented Reality (ISMAR), IEEE, 2013.

Kan, Peter, and Hannes Kaufmann, "High-quality reflections, refractions, and caustics in augmented reality and their contribution to visual coherence", 2012 IEEE International Symposium on Mixed and Augmented Reality (ISMAR), IEEE, 2012.

McGuire et al., Efficient GPU screen-space ray tracing, Journal of Computer Graphics Techniques, vol. 3, No. 4, 2014.

Henrik Wann Jenson, Niels Jorden Christensen, Photon maps in bidirectional Monte Carlo ray tracing of complex objects, In Computers & Graphics, vol. 19, Issue 2, 1995, pp. 215-224, ISSN 0097-8493.

Celarek, Adam, "Merging ray tracking and rasterization in mixed reality", Vienna University of Technology (2012).

(56) References Cited

OTHER PUBLICATIONS

Santos et al., "Real Time Ray Tracing for Augmented Reality", 14th Symposium on Virtual and Augmented Reality, May 28-31, 2012, pp. 2-8.
"U.S. Appl. No. 14/479,322, Final Office Action dated Jun. 4, 2015", 19 pgs.
"U.S. Appl. No. 14/479,322, Non Final Office Action dated Jan. 22, 2015", 26 pgs.
"U.S. Appl. No. 14/479,322, Notice of Allowance dated Aug. 29, 2016", 8 pgs.
"U.S. Appl. No. 14/479,322, Notice of Non-Compliant Amendment dated Apr. 29, 2015", 2 pgs.
"U.S. Appl. No. 14/479,322, Notice of Non-Compliant Amendment dated Jul. 29, 2016", 3 pgs.
"U.S. Appl. No. 14/479,322, Response filed Feb. 22, 2016 to Final Office Action dated Jun. 4, 2015", 9 pgs.
"U.S. Appl. No. 14/479,322, Response filed Apr. 22, 2015 to Non Final Office Action dated Jan. 22, 2015", 10 pgs.
"U.S. Appl. No. 14/479,322, Response filed May 21, 2015 to Notice of Non-Compliant Amendment dated Apr. 29, 2015", 10 pgs.
"U.S. Appl. No. 14/479,322, Response filed Aug. 15, 2016 to Notice of Non-Compliant Amendment dated Jul. 29, 2016", 10 pgs.
"U.S. Appl. No. 14/868,461, Final Office Action dated Jun. 3, 2016", 7 pgs.
"U.S. Appl. No. 14/868,461, Non Final Office Action dated Jan. 5, 2016", 8 pgs.
"U.S. Appl. No. 14/868,461, Notice of Allowance dated Sep. 13, 2016", 5 pgs.
"U.S. Appl. No. 14/868,461, Response filed May 3, 2016 to Non Final Office Action dated Jan. 5, 2016", 1 pg.
"U.S. Appl. No. 14/868,461, Response filed Aug. 29, 2016 to Final Office Action dated Jun. 3, 2016", 1 pg.
"U.S. Appl. No. 15/009,442, Non Final Office Action dated Mar. 21, 2017", 9 pgs.
"U.S. Appl. No. 15/009,442, Notice of Allowance dated Jun. 29, 2017", 5 pgs.
"U.S. Appl. No. 15/009,442, Response filed Jun. 12, 2017 to Non Final Office Action dated Mar. 21, 2017", 4 pgs.
"U.S. Appl. No. 15/615,037, Final Office Action dated Jul. 11, 2018", 13 pgs.
"U.S. Appl. No. 15/615,037, Non Final Office Action dated Sep. 27, 2017", 15 pgs.
"U.S. Appl. No. 15/615,037, Notice of Allowance dated Jan. 15, 2019", 5 pgs.
"U.S. Appl. No. 15/615,037, Notice of Non-Compliant Amendment dated Dec. 26, 2017", 3 pgs.
"U.S. Appl. No. 15/615,037, Response filed Jan. 7, 2019 to Final Office Action dated Jul. 11, 2018", 4 pgs.
"U.S. Appl. No. 15/615,037, Response filed Feb. 21, 2018 to Notice of Non-Compliant Amendment dated Dec. 26, 2017", 5 pgs.
"U.S. Appl. No. 15/615,037, Response filed Nov. 13, 2017 to Non Final Office Action dated Sep. 27, 2017", 5 pgs.
"U.S. Appl. No. 15/615,037, Response filed Dec. 31, 2018 to Final Office Action dated Jul. 11, 2018", 4 pgs.
"U.S. Appl. No. 15/640,464, 312 Amendment filed Dec. 10, 2018", 3 pgs.
"U.S. Appl. No. 15/640,464, Final Office Action dated Dec. 27, 2017", 14 pgs.
"U.S. Appl. No. 15/640,464, Non Final Office Action dated Mar. 30, 2018", 11 pgs.
"U.S. Appl. No. 15/640,464, Non Final Office Action dated Sep. 27, 2017", 17 pgs.
"U.S. Appl. No. 15/640,464, Notice of Allowance dated Oct. 26, 2018", 5 pgs.
"U.S. Appl. No. 15/640,464, PTO Response to Rule 312 Communication dated Dec. 13, 2018", 2 pgs.
"U.S. Appl. No. 15/640,464, Response filed Mar. 12, 2018 to Final Office Action dated Dec. 27, 2017", 1 pg.
"U.S. Appl. No. 15/640,464, Response filed Nov. 13, 2017 to Non Final Office Action dated Sep. 27, 2017", 6 pgs.
"U.S. Appl. No. 15/640,466, Ex Parte Quayle Action mailed Oct. 15, 2018", 4 pgs.
"U.S. Appl. No. 15/640,466, Final Office Action dated Apr. 3, 2018", 9 pgs.
"U.S. Appl. No. 15/640,466, Non Final Office Action dated Oct. 5, 2017", 11 pgs.
"U.S. Appl. No. 15/640,466, Notice of Allowance dated Jan. 28, 2019", 5 pgs.
"U.S. Appl. No. 15/640,466, Notice of Allowance dated Dec. 26, 2018", 7 pgs.
"U.S. Appl. No. 15/640,466, Response filed Mar. 5, 2018 to Non Final Office Action dated Oct. 5, 2017", 4 pgs.
"U.S. Appl. No. 15/640,466, Response filed Sep. 19, 2018 to Final Office Action dated Apr. 3, 2018", 5 pgs.
"U.S. Appl. No. 15/640,466, Response filed Dec. 10, 2018 to Ex Parte Quayle Action mailed Oct. 15, 2018", 6 pgs.
"U.S. Appl. No. 15/640,467, 312 Amendment filed Dec. 10, 2018", 3 pgs.
"U.S. Appl. No. 15/640,467, Corrected Notice of Allowability dated Oct. 22, 2018", 4 pgs.
"U.S. Appl. No. 15/640,467, Final Office Action dated Apr. 3, 2018", 9 pgs.
"U.S. Appl. No. 15/640,467, Non Final Office Action dated Oct. 4, 2017", 11 pgs.
"U.S. Appl. No. 15/640,467, Notice of Allowance dated Oct. 3, 2018", 7 pgs.
"U.S. Appl. No. 15/640,467, PTO Response to Rule 312 Communication dated Dec. 17, 2018", 2 pgs.
"U.S. Appl. No. 15/640,467, Response filed Mar. 5, 2018 to Non Final Office Action dated Oct. 4, 2017", 4 pgs.
"U.S. Appl. No. 15/640,467, Response filed Sep. 23, 2018 to Final Office Action dated Apr. 3, 2018", 6 pgs.
"U.S. Appl. No. 15/659,618, Non Final Office Action dated Oct. 30, 2017", 11 pgs.
"U.S. Appl. No. 15/659,618, Notice of Allowance dated Apr. 10, 2018", 7 pgs.
"U.S. Appl. No. 15/659,618, PTO Response to Rule 312 Communication dated Jun. 19, 2018", 2 pgs.
"U.S. Appl. No. 15/659,618, Response filed Mar. 5, 2018 to Non Final Office Action dated Oct. 30, 2017", 8 pgs.
"U.S. Appl. No. 15/984,359, Final Office Action dated Jan. 2, 2019", 5 pgs.
"U.S. Appl. No. 15/984,359, Non Final Office Action dated Sep. 24, 2018", 10 pgs.
"U.S. Appl. No. 15/984,359, Notice of Allowance dated Apr. 1, 2019", 5 pgs.
"U.S. Appl. No. 15/984,359, Response filed Mar. 18, 2019 to Final Office Action dated Jan. 2, 2019", 6 pgs.
"U.S. Appl. No. 15/984,359, Response filed Dec. 16, 2018 to Non Final Office Action dated Sep. 24, 2018", 10 pgs.
"U.S. Appl. No. 16/231,520, Final Office Action dated Apr. 10, 2019", 6 pgs.
"U.S. Appl. No. 16/231,520, Non Final Office Action dated Jan. 30, 2019", 7 pgs.
"U.S. Appl. No. 16/231,520, Notice of Allowance dated May 17, 2019", 5 pgs.
"U.S. Appl. No. 16/231,520, Notice of Allowance dated Jul. 26, 2019", 5 pgs.
"U.S. Appl. No. 16/231,520, Response filed Mar. 27, 2019 to Non Final Office Action dated Jan. 30, 2019", 6 pgs.
"U.S. Appl. No. 16/231,520, Response filed May 5, 2019 to Final Office Action dated Apr. 10, 2019", 6 pgs.
"U.S. Appl. No. 16/275,366, Non Final Office Action dated Apr. 1, 2019", 8 pgs.
"U.S. Appl. No. 16/275,366, Notice of Allowance dated May 13, 2019", 7 pgs.
"U.S. Appl. No. 16/275,366, Response filed Apr. 21, 2019 to Non Final Office Action dated Apr. 1, 2019", 3 pgs.
"U.S. Appl. No. 16/275,371, Non Final Office Action dated Apr. 1, 2019", 10 pgs.
"U.S. Appl. No. 16/275,371, Notice of Allowance dated May 10, 2019", 7 pgs.

(56) References Cited

OTHER PUBLICATIONS

"U.S. Appl. No. 16/275,371, Response filed Apr. 21, 2019 to Non Final Office Action dated Apr. 1, 2019", 3 pgs.
"U.S. Appl. No. 16/275,907, Non Final Office Action dated Apr. 10, 2019", 6 pgs.
"U.S. Appl. No. 16/275,907, Notice of Allowance dated May 13, 2019", 5 pgs.
"U.S. Appl. No. 16/275,907, Response filed Apr. 21, 2019 to Non Final Office Action dated Apr. 10, 2019", 3 pgs.
"U.S. Appl. No. 16/444,431, 312 Amendment filed Mar. 10, 2020", 3 pgs.
"U.S. Appl. No. 16/444,431, Non Final Office Action dated Jul. 5, 2019", 11 pgs.
"U.S. Appl. No. 16/444,431, Notice of Allowance dated Nov. 7, 2019", 5 pgs.
"U.S. Appl. No. 16/444,431, PTO Response to Rule 312 Communication dated Mar. 16, 2020", 2 pgs.
"U.S. Appl. No. 16/444,431, Response filed Nov. 3, 2019 to Non Final Office Action dated Jul. 5, 2019", 9 pgs.
"U.S. Appl. No. 16/444,464, Non Final Office Action dated Jul. 9, 2019", 14 pgs.
"U.S. Appl. No. 16/444,464, Notice of Allowance dated Oct. 11, 2019", 7 pgs.
"U.S. Appl. No. 16/444,464, Response filed Oct. 3, 2019 to Non Final Office Action dated Jul. 9, 2019", 5 pgs.
"U.S. Appl. No. 16/662,657, Non Final Office Action dated Dec. 19, 2019", 6 pgs.
"U.S. Appl. No. 16/662,657, Notice of Allowance dated Mar. 23, 2020", 5 pgs.
"U.S. Appl. No. 16/662,657, Preliminary Amendment filed Nov. 15, 2019", 3 pgs.
"U.S. Appl. No. 16/662,657, Response filed Mar. 10, 2020 to Non Final Office Action dated Dec. 19, 2019", 8 pgs.
"U.S. Appl. No. 16/736,848, 312 Amendment filed Aug. 4, 2020", 3 pgs.
"U.S. Appl. No. 16/736,848, Non Final Office Action dated Feb. 11, 2020", 16 pgs.
"U.S. Appl. No. 16/736,848, Notice of Allowance dated May 14, 2020", 7 pgs.
"U.S. Appl. No. 16/736,848, Response filed May 5, 2020 to Non Final Office Action dated Feb. 11, 2020", 3 pgs.
"U.S. Appl. No. 16/788,845, 312 Amendment filed Aug. 16, 2020", 3 pgs.
"U.S. Appl. No. 16/788,845, Non Final Office Action dated Mar. 6, 2020", 4 pgs.
"U.S. Appl. No. 16/788,845, Notice of Allowance dated Jun. 15, 2020", 5 pgs.
"U.S. Appl. No. 16/788,845, PTO Response to Rule 312 Communication dated Aug. 21, 2020", 2 pgs.
"U.S. Appl. No. 16/788,845, Response filed Jun. 2, 2020 to Non Final Office Action dated Mar. 6, 2020", 5 pgs.
"U.S. Appl. No. 16/909,063, Non Final Office Action dated Aug. 25, 2020", 8 pgs.
"U.S. Appl. No. 16/909,063, Notice of Allowance dated Nov. 23, 2020", 5 pgs.
"U.S. Appl. No. 16/909,063, Response filed Nov. 8, 2020 to Non Final Office Action dated Aug. 25, 2020", 5 pgs.
"U.S. Appl. No. 16/994,615, Non Final Office Action dated Aug. 25, 2020", 17 pgs.
"U.S. Appl. No. 16/994,615, Notice of Allowance dated Feb. 1, 2021", 7 pgs.
"U.S. Appl. No. 16/994,615, Response filed Nov. 8, 2020 to Non Final Office Action dated Aug. 25, 2020", 3 pgs.
"U.S. Appl. No. 17/019,274, Non Final Office Action dated Nov. 9, 2020", 8 pgs.
"U.S. Appl. No. 17/019,274, Notice of Allowance dated Feb. 8, 2021", 5 pgs.
"U.S. Appl. No. 17/019,274, Response filed Jan. 28, 2021 to Non Final Office Action dated Nov. 9, 2020", 5 pgs.
"U.S. Appl. No. 17/183,395, Non Final Office Action dated Jul. 28, 2021", 8 pgs.
"U.S. Appl. No. 17/183,395, Notice of Allowance dated Dec. 20, 2021", 5 pgs.
"U.S. Appl. No. 17/183,395, Response filed Dec. 2, 2021 to Non Final Office Action dated Jul. 28, 2021", 7 pgs.
Alwani, Rishi, "Microsoft and Nvidia Tech to Bring Photorealistic Games With Ray Tracing", Gadgets 360, [Online] Retrieved from the Internet: <URL: https://gadgets.ndtv.com/laptops/news/microsoft-dxr-nvidia-rtx-ray-tracing-volta-gpu-metro-exodus-1826988>, (Mar. 21, 2018), 8 pgs.
Beck, et al., "CPU-GPU hybrid real time ray tracing framework", vol. 0 (1981), (2005), 1-8.
Bikker, J, "Real-time ray tracing through the eyes of a game developer", In: Proceedings of the 2007 IEEE Symposium on Interactive Ray Tracing, Washington, DC, USA, IEEE Computer Society, (2007), 10 pgs.
Chen, C. C, et al., "Use of hardware z-buffered rasterization to accelerate ray tracing", In: Proceedings of the 2007 ACM symposium on Applied computing. SAC '07, New York, NY, USA, ACM, (2007), 1046-1050.
Fredriksson, Johan, et al., "Generating Real Time Reflections by Ray Tracing Approximate Geometry", Chalmers University of Technology, Gothenburg, Sweden, (2016), 46 pgs.
Kajiya, J. T, "The rendering equation", In Proc. SIGGRAPH, vol. 20, No. 4, (1986), 143-150.
Peddie, Jon, "Peddie predicts we could have real time ray tracing on our PCs in less than 6 years", TechWatch, [Online] Retrieved from the Internet: <URL: https://www.jonpeddie.com/press-releases/peddie-predicts-we-could-have-real-time-ray-tracing-on-our-pcs-in-less-than/>, (Mar. 27, 2018), 2 pgs.
Sabino, Thales, et al., "A Hybrid GPU Rasterized and Ray Traced Rendering Pipeline for Real Time Rendering of Per Pixel Effects", ICEC 2012, Univ. Federal Fluminense, Rio de Janeiro, Brazil, (2013), 14 pgs.
Sadeghi, Iman, et al., "Coherent Path Tracing", Jensen University of California, San Diego, (2009), 12 pgs.
Wald, et al., "Interactive Rendering with Coherent ray Tracing", Computer Graphics Forum vol. 20, (Sep. 2001), 153-165.
Wyman, Chris, "Voxelized shadow volumes", Proceedings of the ACM SIGGRAPH Symposium on High Performance Graphics, ACM, (2011), 34 pgs.

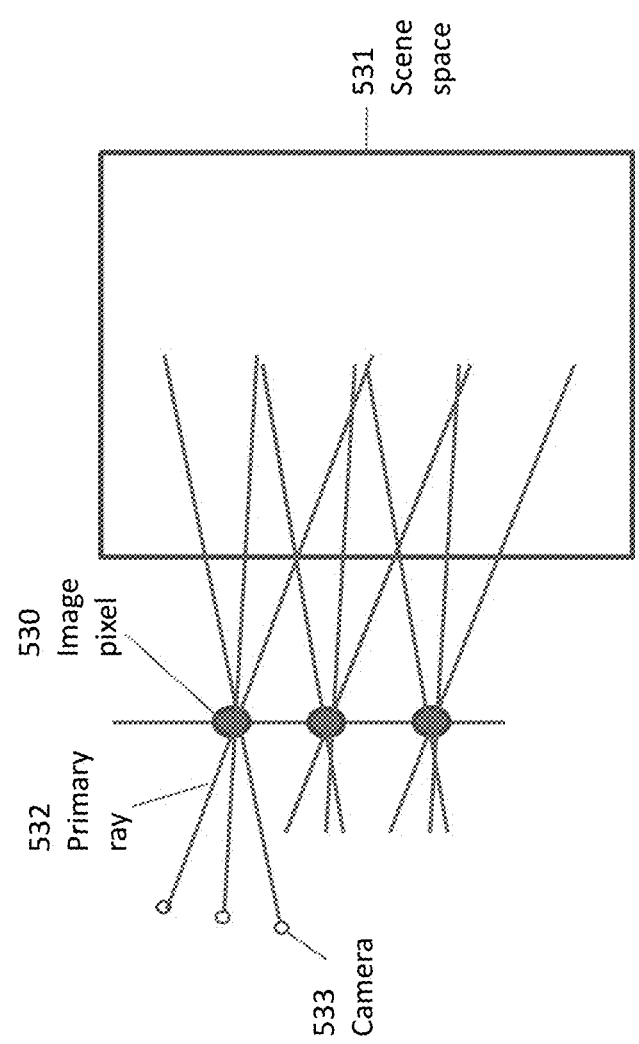

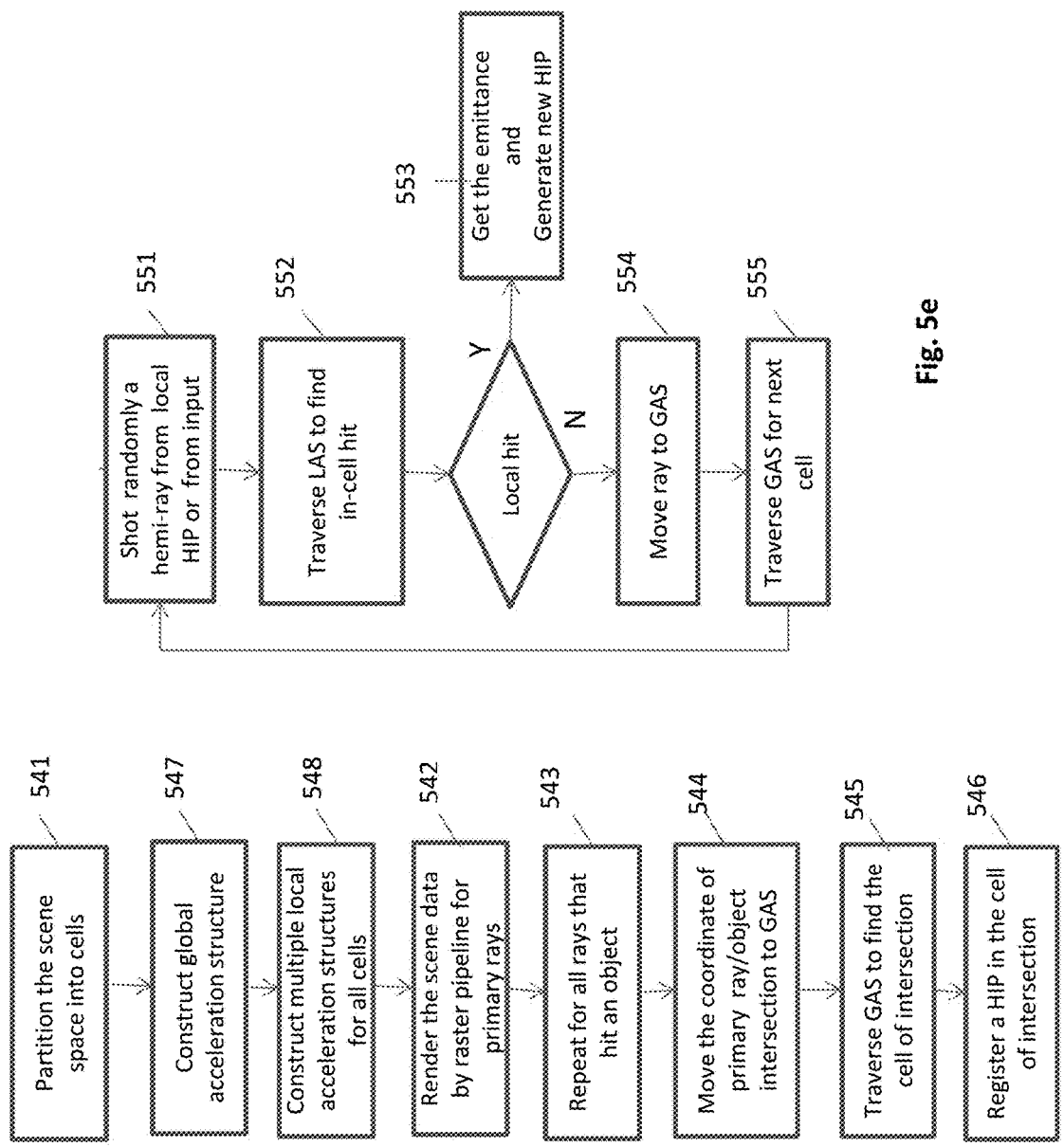

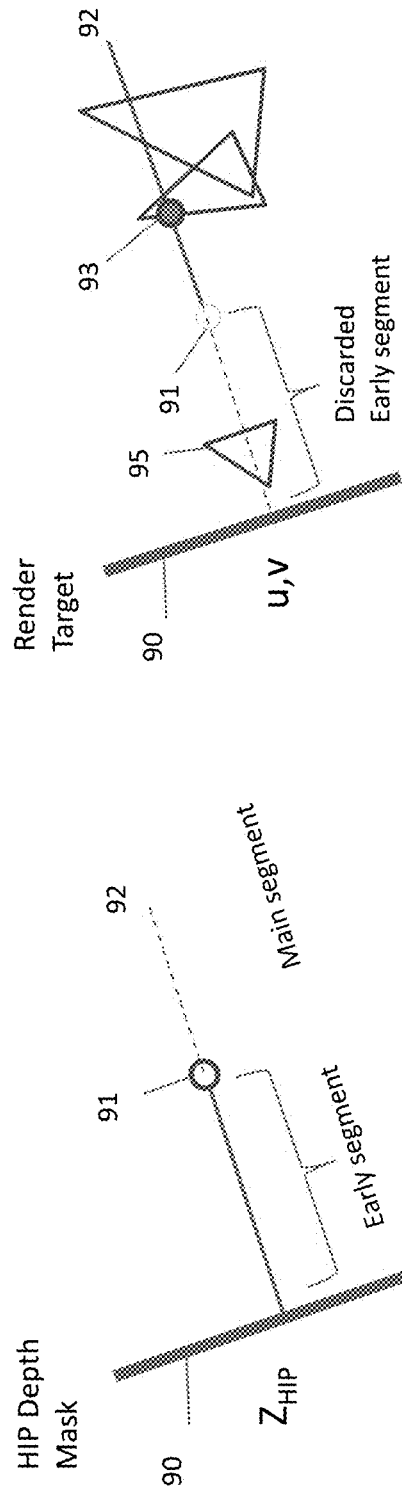

DISTRIBUTED ACCELERATION STRUCTURES FOR RAY TRACING

CROSS-REFERENCE TO RELATED CASES

The present application is a continuation of the U.S. application Ser. No. 17/019,274, entitled "Multiprocessing System for Path Tracing of Big Data", filed Sep. 13, 2020; which is a continuation of U.S. application Ser. No. 16/788,845 (U.S. Pat. No. 10,818,072) filed Feb. 13, 2020 entitled "Multiprocessing System for Path Tracing of Big Data"; which is a continuation of the U.S. application Ser. No. 16/444,431 (U.S. Pat. No. 10,614,614), filed Jun. 18, 2019 entitled "Path Tracing System Employing Distributed Acceleration Structures"; which is a continuation of U.S. application Ser. No. 15/984,359 (U.S. Pat. No. 10,380,785) filed May 20, 2018 entitled "Path Tracing Method Employing Distributed Accelerating Structures"; which is a continuation of U.S. application Ser. No. 15/376,580 filed Dec. 12, 2016 entitled "Path Tracing Method Implemented on Cells and Employing Distributed Acceleration Structures"; which claims the benefit of U.S. Provisional Application Ser. No. 62/266,584, filed on Dec. 12, 2015, of U.S. Provisional Application Ser. No. 62/289,927, filed on Feb. 2, 2016, of U.S. Provisional Application Ser. No. 62/354,755, filed on Jun. 26, 2016, and of U.S. Provisional Application Ser. No. 62/408,730, filed on Oct. 15, 2016, and is a continuation-in-part of the U.S. application Ser. No. 15/009,442 filed Jan. 28, 2016 entitled "Shadowing Method for Ray Tracing Based on Geometrical Stencils" (U.S. Pat. No. 9,741,160); which is a continuation-in-part of the U.S. application Ser. No. 14/868,461 filed Sep. 29, 2015 entitled "Method and Apparatus for an Inter-Cell Shortest Communication" (U.S. Pat. No. 9,558,530); all of which are hereby incorporated by reference.

FIELD OF THE INVENTION

The present invention relates to new and improved ways for carrying out the path tracing method of parallel graphics rendering.

BACKGROUND OF THE INVENTION

Path tracing is a computer graphic method for a realistic rendering of three-dimensional scenes, based on global illumination. Global illumination takes into account not only the light which comes directly from a light source, but also subsequent cases in which light rays from the same source are reflected by other surfaces in the scene, whether reflective or not (indirect illumination).

Fundamentally, global illumination integrates over all the luminance arriving to a single point on the surface of a rendered object. This luminance is then reduced by a surface reflectance function (BRDF) to determine how much of it will go towards the viewpoint camera. This integration procedure is repeated for every pixel in the output image. When combined with physically accurate models of surfaces, accurate models of real light sources, and optically-correct cameras, path tracing can produce still images that are indistinguishable from photographs.

Path tracing naturally simulates many effects that have to be specifically added to other methods (conventional ray tracing or scanline rendering), such as soft shadows, depth of field, motion blur, caustics, ambient occlusion, and indirect lighting.

Path tracing is a computationally intensive algorithm. The basic and most time consuming task in path tracing is the locating of intersection points between millions of rays and millions of polygons. In prior art it is done by massive traversals of accelerating structures and by resolving intersection tests. Traversals are typically taking 60%-70% of rendering time. In addition, the need to modify or reconstruct acceleration structures before each dynamic frame, limits the performance.

Fortunately, path tracing is quite easy to parallelize. The contribution of each ray to the final image can be computed independently of other rays. There are two main parallelization approaches in the prior art: (i) ray-parallel, in which rays are distributed among parallel processors, while each processor traces a ray all the way, and (ii) data-parallel, in which the scene is distributed among multiple processors, while a ray is handled by multiple processors in a row.

The ray-parallel implementation, subdividing the image space into a number of disjoint regions, replicates all the scene data with each processor. Each processor, renders a number of screen regions using the unaltered sequential version of the path tracing algorithm, until the whole image is completed. Load balancing is achieved dynamically by sending new tasks to processors that have just become idle. However, if a large model needs to be rendered, the local memory of each processor is not large enough to hold the entire scene. This is evident from FIG. 1 where the performance of CPU based rendering systems is compared with that of GPUs. GPU has a limited amount of video memory, therefore the effect of performance diminution occurs earlier than in CPU, which has an unlimited memory. Due to the limitation of local memory, for large models a central storage must be used, as pictured in FIG. 2, for the geometric data, acceleration structures and textures. Each processor needs a massive access to these resources. Such a centralization of resources causes a severe bottleneck. The hurdle grows with the data size, and get even worse when a central mass storage has to be used for a large data. The relatively long access times of a mass storage, levels of magnitude slower than RAM, become a stoppage for big rendering data.

Data-parallel is a different approach to rendering, best for large data cases that do not fit into a single processor's memory. Each processor owns a subset of the database, tracing rays only when they pass through its own subspace (cell). As shown in FIG. 3, the subsets of the geometry data and textures are kept in private memories, each designated a processor. The acceleration structures are broken down to small local substructures, and distributed among subsets. High locality is achieved by treating the relevant segment of a transitory ray by the local data and local acceleration structure, with a little need of central resources. Data locality is a desirable feature in path tracing: it reduces moves of massive data, contributes to a higher utilization of cache memories, reduces the use of main memory, and decreases the need of massive data moves. The high locality of the data parallel approach might be advantageous for very large models. However, the efficiency in data parallel rendering systems tends to be low, bringing up several challenges. There is a high interprocessor communication due to the massive amount of rays that must pass among the subsets of data. These passages involve a massive interfacing among the local acceleration structures. Such interfacing must be handled efficiently and well synchronized. Furthermore, the amount of communicating rays must be reduced to achieve a satisfactory efficiency.

OBJECTS AND SUMMARY OF THE PRESENT INVENTION

Accordingly, a primary object of the present invention is to provide a new and improved method of and apparatus for path tracing, while reducing the high complexity associated with the prior art.

Another object of the present invention is to provide a new and improved method of and apparatus for path tracing, while enabling an efficient rendering of big data.

Another object of the present invention is to provide a new and improved mechanism for locating intersection points between rays and objects for global illumination rendering.

Another object of the present invention is to provide a new and improved acceleration structure mechanism for data parallel path tracing, consisting of global and local components.

Another object of the present invention is to decrease the complexity of path tracing by reducing the traversals of acceleration structures.

Another object of the present invention is to provide a new and improved local acceleration structure.

Yet another object of the present invention is to replace the complex traversals of acceleration structures by a new and low complexity mechanism.

Yet another object of the present invention is to replace the complex traversals of acceleration structures by a new and low complexity mechanism implementable by the graphics pipeline.

These and other objects of the present invention will become apparent hereinafter and in the claims to invention.

The embodiments of the present invention follow the data parallel approach, therefore the scene data are fragmented into numerous non-uniform sub-volumes of cells. Cell is a basic unit of process and data locality.

According to one embodiment, the task of traversals is divided between the global acceleration structure, and multiple small local acceleration structures. The local acceleration structures, along with the local geometry data and textures reside in cells. Each cell is assigned a processor, on a demand driven bask. These rendering processors may come on different platforms of CPUs, GPUs or both. Each cell builds its own acceleration structure for the local portion of data. It means that the global acceleration structure remains the only central element, while its size and load are greatly reduced. Each cell handles ray traversal for its local domain only, meaning that there is no need to retrieve data from external devices (central memory or hard disks), saving the big penalty of slow access times. The secondary (the term 'secondary' generally stands for secondary, ternary, and higher generations of HIPs and bouncing rays) rays are generated locally at each cell.

Another embodiment of the present invention replaces the local acceleration structures with a new and improved method and apparatus for locating ray/object intersections. It comprises a low complexity collective shooting method in a cell, facilitated by the graphics pipeline. According to this method, the encounter between the ray and object is projected by 'visualizing', in a sense similar to the human seeing, eliminating the need for expensive line/object mathematical intersections. The communication of rays among cells is still carried by the global acceleration structure. However, this communication is reduced: due to many cell-internal rays that do not use the global acceleration structure, and due to lowering the traversal complexity by knowing-ahead the intersection coordinates. This reduces greatly the amount of traversals of secondary rays, and offloads the global acceleration structure which otherwise, due to its centrality, would be subject to bottleneck effect.

BRIEF DESCRIPTION OF THE DRAWINGS

For a more complete understanding of how to practice the Objects of the Present Invention, the following Detailed Description of the Illustrative Embodiments can be read in conjunction with the accompanying Drawings, briefly described below.

DETAILED DESCRIPTION OF THE PREFERRED EMBODIMENTS

Figure 1:
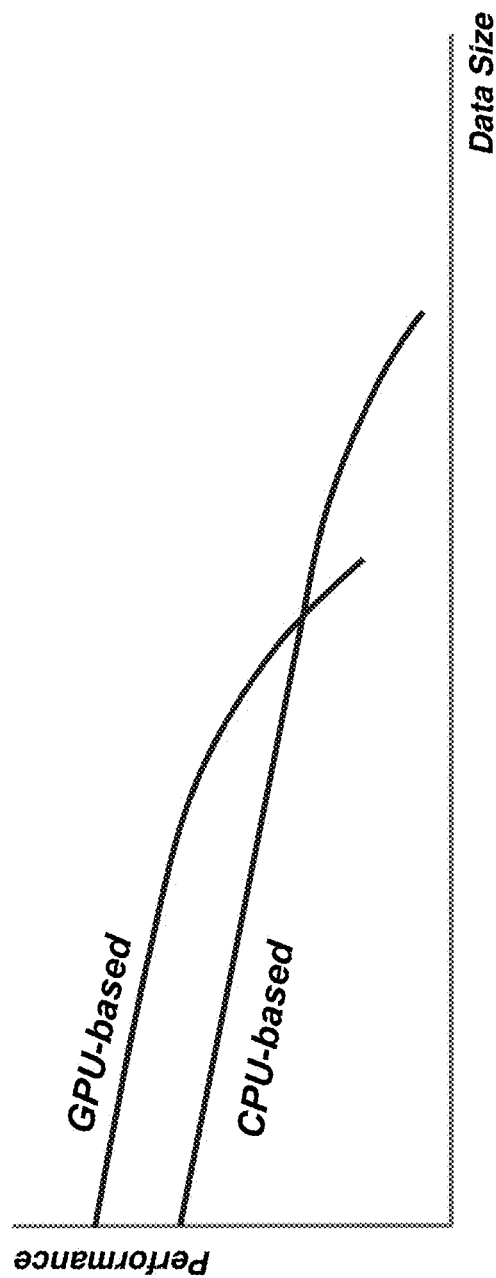
FIG. 1. Prior Art. Performance degradation of CPU and GPU based rendering, as a function of data size FIG. 2. Prior art. Ray parallel approach. When the local memory of each processor is not large enough to hold the entire scene, a central data repository has to be used FIG. 3. Prior art. Data parallel approach.
Figure 2:
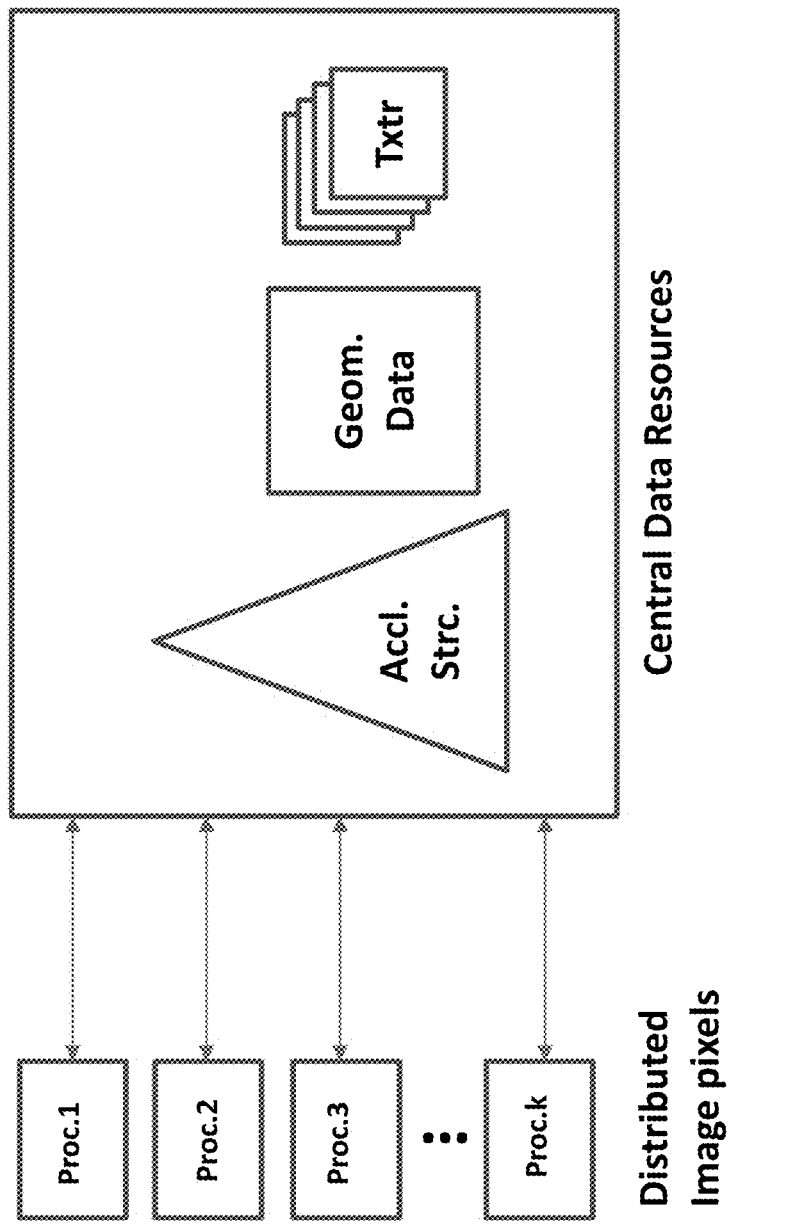
Figure 3:
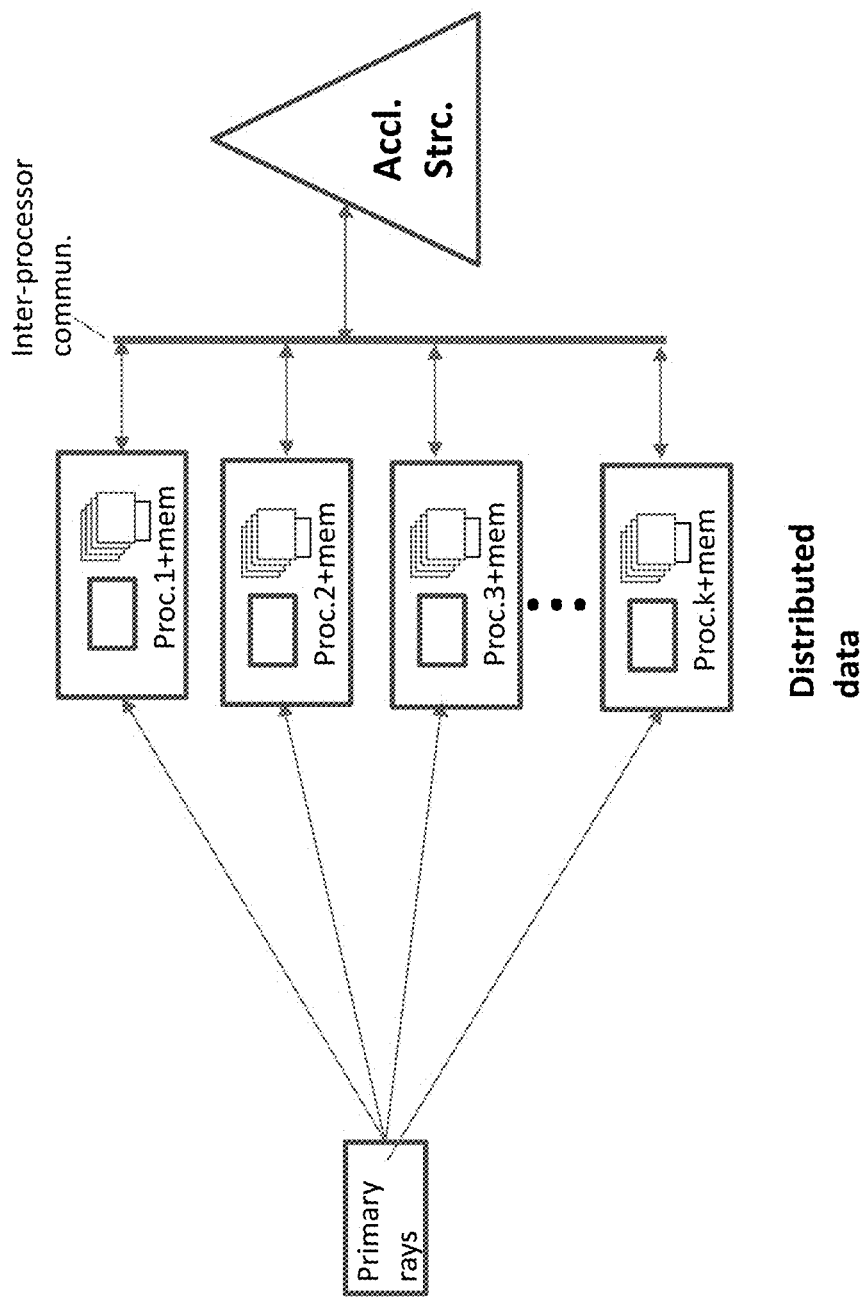
Figure 4A:
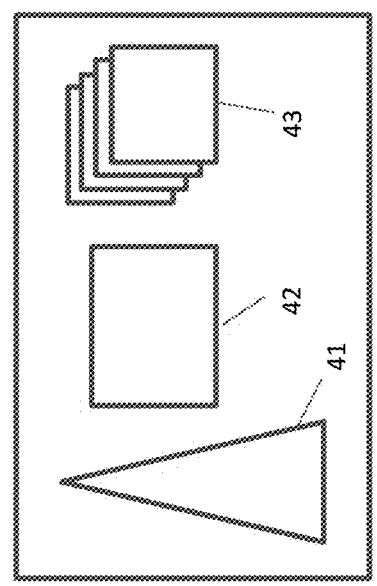
FIG. 4a. A cell with local acceleration structure, local data and local texture
Figure 4C:
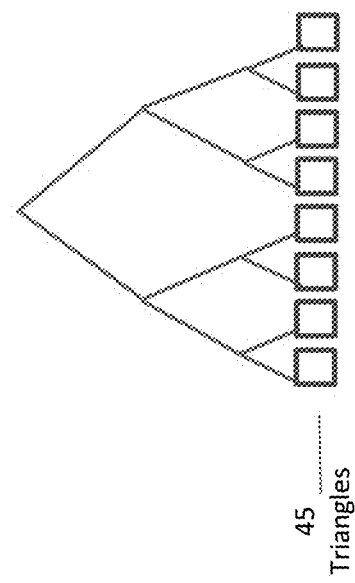
FIG. 4c. An example of a local acceleration structure
Figure 4B:
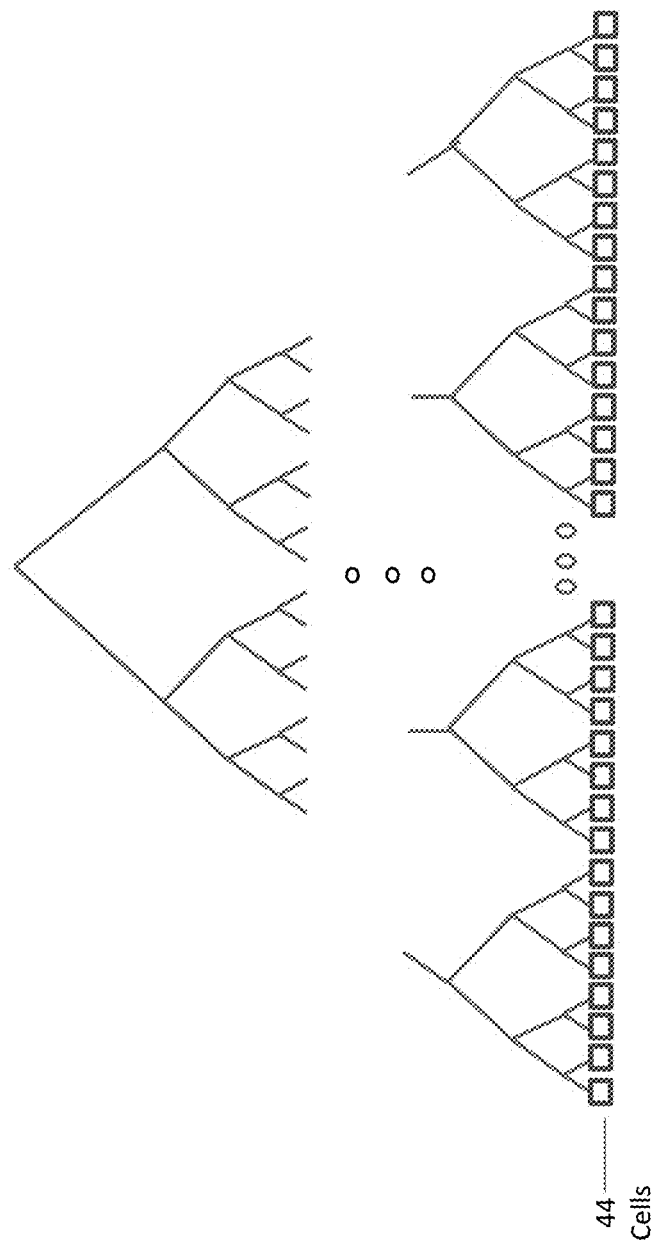
FIG. 4b. An example of a global acceleration structure

According to an embodiment of the present invention, the task of traversals is divided between the global acceleration structure, and multiple small local acceleration structures, as depicted in FIG. 4b and FIG. 4b, respectively. As shown in FIG. 4a, the local acceleration structure 41 resides in the cell, along with the local geometry data 42 and textures 43. Each cell is assigned a processor, on a demand driven bask. These rendering processors may come either as a multiple CPU or a multiple GPU based platforms.

The basic data elements of the global acceleration structure, FIG. 4b, are cells. They are leaves of the binary tree 44, replacing the triangles (or other 3D primitives) of the prior art. The leaves of the local acceleration structure, FIG. 4c, are triangles 45. This partition of the acceleration structure into two components, shrinks the global part of it by many levels, improving the performance. E.g. for a geometric data of 8 million triangles which are distributed among 8,000 cells, the global binary tree of acceleration structure, instead of having 23 levels and ~8,000,000 leaves as a full tree of prior art, in will shrink to only 10 hierarchical levels and ~8,000 leaves, dramatically reducing the central traversal load. An average local tree will keep 1,000 triangles. Each cell builds its own acceleration structure for an autonomous rendering of its local sub-space data. It means that the only central element remains the global acceleration structure, however, as described hereinafter, its size and load are greatly reduced.

Figure 5A:
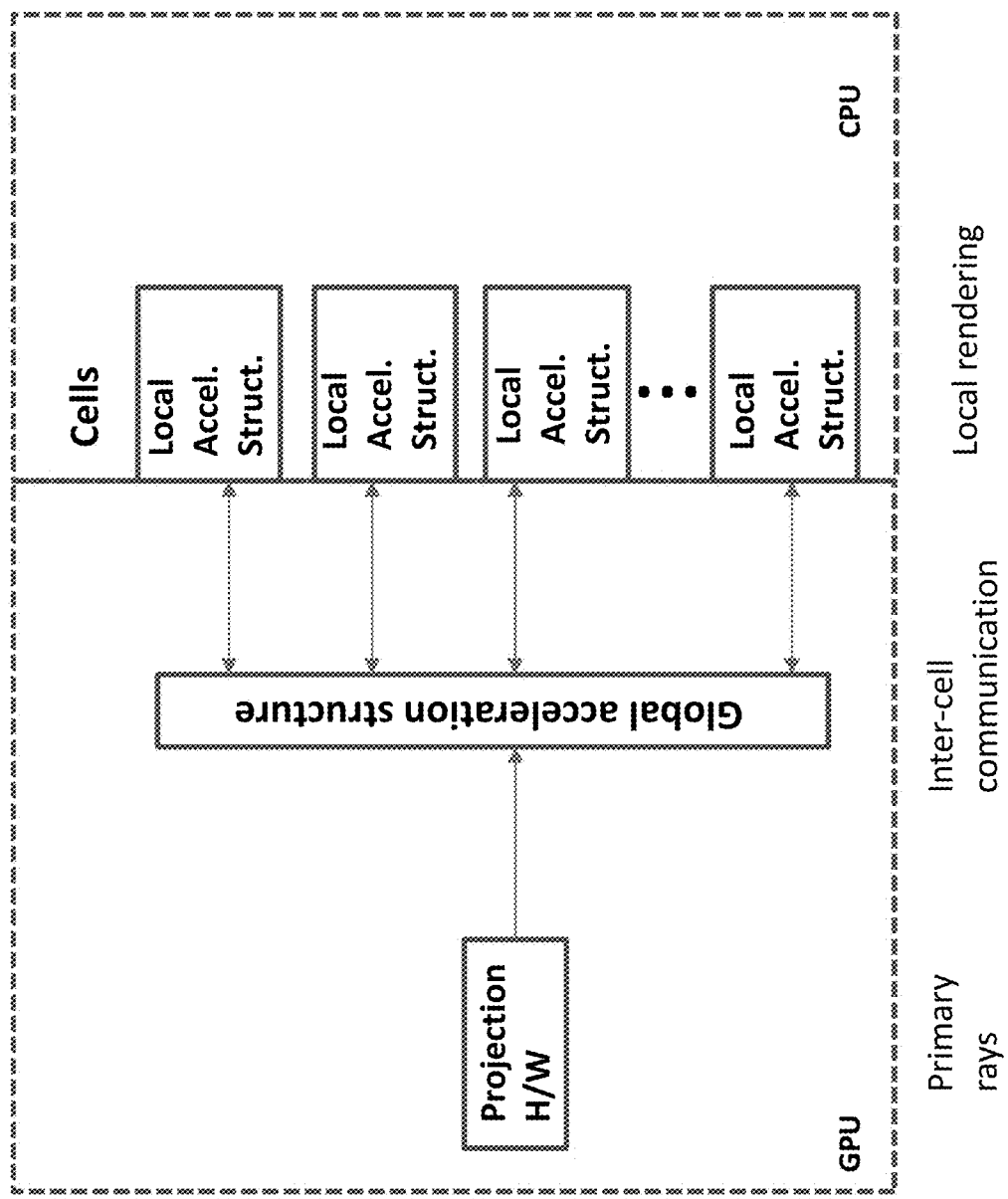
FIG. 5a. Data parallel system according to an embodiment of present invention

As shown in FIG. 5a, the cells are first populated by primary hit points (HIPs), following the shootings of primary rays. The primary rays are preferable projected by GPU. The intersection points ray/objects are found by theft coordinates in the scene space. These points must be distributed to their corresponding cells. Each projected intersection point is first moved to the global acceleration structure, and then navigated by its [x,y,z] coordinates into its hosting cell. Once the host cell is reached, the HIP is put in place by traversing the local tree. A primary HIP is a source for secondary rays. A secondary ray, shot from primary HIP could transfer through multiple cells to find the target cell. As shown in FIG. 5a, also the inter-cell communication is done by traversing the global acceleration structure.

Each cell of transit treats its corresponding segment of ray vs. local data, meaning that there is no need to retrieve data from external devices (central memory or hard disks). This saves the penalty of slow access times. The secondary (and higher) rays are generated locally at each cell. Some of them terminate at the cell, hitting local objects, the rest is communicated to other cells utilizing the global acceleration structure.

When a cell receives rays, the rays are rearranged into coherent packets, in order to gain an increased performance, utilizing the architectural advantage of the platform. Today's CPU architecture provides extensive SIMD abilities (up to 512 bits:16 floats in current architecture), which can be utilized to perform parallel traverse on acceleration trees. This method, known as packet traverse, would provide superior traverse and intersection test performance, as long as the rays in the packet are correlated. This applies even more strongly to GPU platforms, in which memory coherency is crucial. A natural coherence is present only on the primary rays, as long as their path is short enough. Secondary rays must be brought to coherency in order to apply the packet method, which improves the advantage drastically.

According to an embodiment of the current invention, the rays that move between local and global structures, are rearranged into packets on the transition phase, so the packets in the entry to the local acceleration structure would comprise coherent rays.

Reordering is preformed in a few levels. First, a packet with rays all targeted to the same cell. Further sorting can be done, so all the packet rays enter the cell at the same face. A packet can be rearranged several times on its course, to keep the coherency. There is a cost, in latency and in processing, but the advantage of using packets outperforms the cost.

As mentioned, a GPU hardware is employed for the primary rays. In order to randomize the primary rays, such that the HIP samples (as described hereinafter in FIG. 6) will be stochastically dispersed in the scene 531, a fluctuation of projected rays is done. The fluctuating rays 532, related to a certain pixel 530, are kept intact with the pixel, while the camera 533 moves accordingly. The cameras for all the screen pixels is moved in a unified way.

Figure 5C:
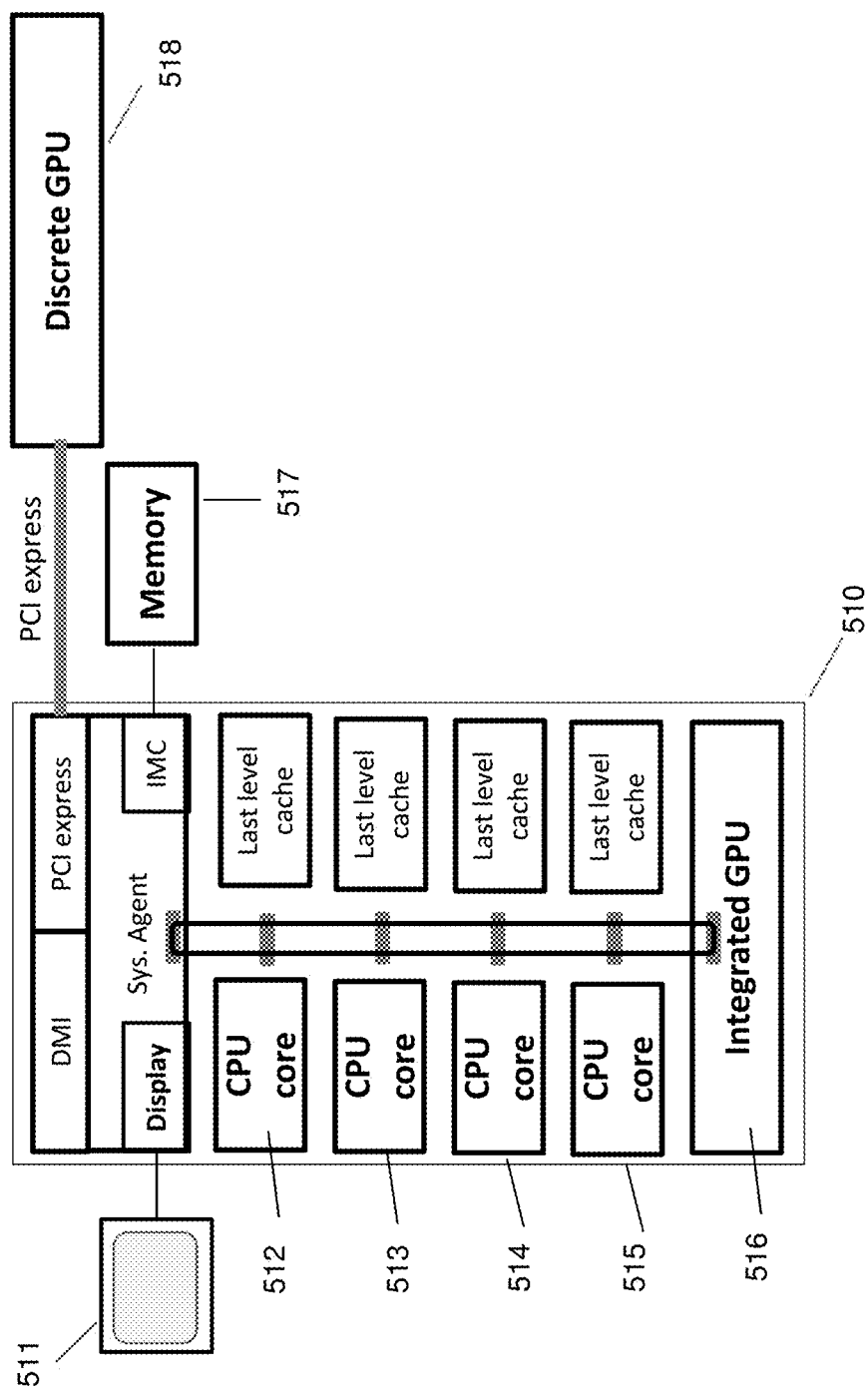
FIG. 5b. Generation of primary rays according to an embodiment of present invention FIG. 5c. A preferable platform according to an embodiment of present invention FIG. 5d. Flowchart of generating a primary HIP FIG. 5e. Flowchart of generating a secondary HIP FIG. 6. Diffuse radiance calculation at a point of a primary hit FIG. 7. The principle of local collective shooting FIG. 8a. Parallel projection of a sub-scene FIG. 8b. A separate HIP data of the sub-scene FIG. 8c. A separate geometry data of the sub-scene FIG. 9a. A HIP rendered for a depth mask FIG. 9b. Rendering the geometric data using the previously created depth mask FIG. 10. Different cases of projection rays in a sub-scene FIG. 11. Lack of accuracy between projection rays and HIPS FIG. 12. Intersection test compensating for lack of accuracy FIG. 13. Multiple projections on a single HIP FIG. 14. New HIPS generated by successive projections FIG. 15. Different cases of secondary rays FIG. 16a. Hemi-ray hitting out of cell FIG. 16b. Traversal of global acceleration structure by a hemi-ray FIG. 17. Flowchart of a single projection-cycle in a cell FIG. 18. Flowchart of a collective shooting in a cell

As mentioned above, and as it is shown in FIG. 5a, the rendering of the embodiment can be preferably split between GPU and CPU. Nevertheless, other implementations are possible as well, e.g. GPU only or CPU only. The GPU creates primary rays and operates the global acceleration structure. The CPU must perform with multiple cores and threads, for a parallel computing of cells. The multicore CPU 510, shown in FIG. 5c, is an example of a preferable platform. It has an integrated GPU 516 and four CPU cores 512-515. All of them reside on a single piece of silicon, having fast interprocessor communication and shared memory 517. For bigger rendering data a discrete GPU 518 can be added, and the multicore can be replaced by a high end CPU with many cores.

Figure 6:
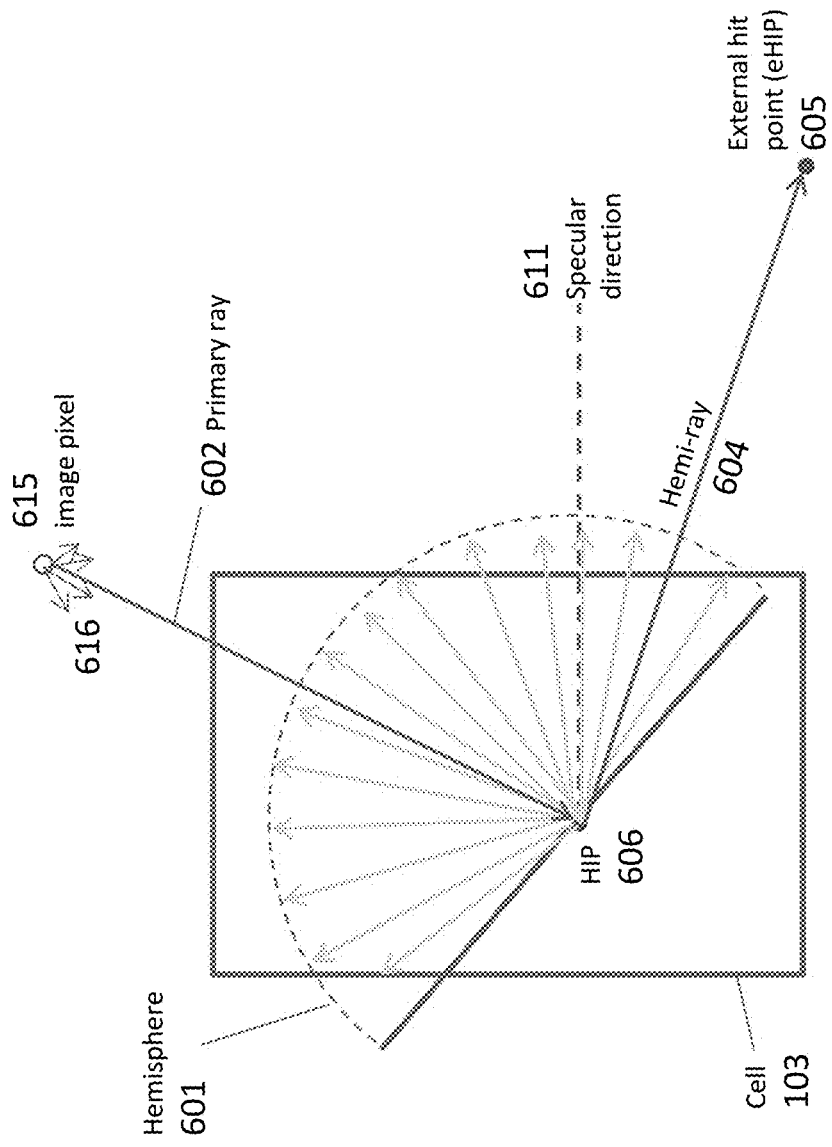

The way the distributed acceleration structures, global (GAS) and local (LAS), work for path tracing is drafted in the flow charts of FIGS. 5d and 5e. The first flow chart, showing how the primary HIP are generated, starts with mapping of the 3D scene space into cells 541. This knowledge is not new, and is described in the applications incorporated herein by reference. Next, accelerating structures are constructed, a single global structure 547, and multiple local structures 548, one for each cell. Then, the scene is rendered by a traditional 3D graphics pipeline (raster hardware) for rays that intersect an object 542. These rays provide the coordinates of the intersection points, to be pinpointed by primary HIPs (hit point). These coordinates must be matched with their target cell, which will be found by traversing the GAS 544-545. Once the target cell is found, the primary HIP is created 546. The second flow chart, in FIG. 5e, shows how the secondary HIP is generated. Referring to FIG. 6, the secondary ray is taken randomly from the hemisphere 601 of the primary HIP 606. Such a secondary ray, called hemi-ray, can either hit an object in the cell, or leave the cell and continue seeking in another cell. The secondary ray can start anew from a local HIP, or can continue an incoming ray 551. First the LAS is traversed for a local hit 552. If an intersection point is found, this point's emittance is sampled for the HIP of origin, and a child HIP is created 553. Otherwise, the ray leaves the cell, and will traverse the GAS, for the next cell 554.

The computed global illumination simulates the real world, where objects and surfaces are visible due to the fact that they are reflecting diffused light. This reflected light illuminates other objects in turn, by diffused inter-reflection. Diffuse inter-reflection is a process whereby light reflected from an object strikes other objects in the surrounding area, illuminating them. Diffuse inter-reflection specifically describes light reflected from objects which are not shiny or specular. It is an important component of global illumination.

Generally, two types of rays are used in path tracing. The primary rays are shot from the viewer's eye via screen pixels into the scene. The primary ray hits an object in the primary hit point (HIP). Secondary rays are then generated, bouncing further into the scene, generating next generations of HIPs.

The calculation of a diffuse radiance at a point of a primary hit on an object is depicted in FIG. 6. The reflected radiance on a surface point, HIP 606, is computed by integrating the incoming radiance over a hemisphere 601, centered at that point on the surface and oriented such that its north pole is aligned with the surface normal. The BRDF (bidirectional reflectance distribution function) is a function that defines how light is reflected at an opaque surface. This lighting equation is too expensive for more than just a small number of directions. Therefore, a smaller number of rays are generated randomly to compute the illumination of a surface.

HIP 606 absorbs reflected radiance from its surroundings. Upon a hit of that ray at some external hit point 605, the amount of reflected light from that hit point is reported to the pixel of origin. The actual ray shooting provides reflectance results, and generates additional rays in the scene space. Each of the hemi-rays 604, is of a different probability, according to a probability distribution function.

Collective shooting of secondary rays. According to another embodiment of the present invention, the heavy traversals of local acceleration structures are replaced by new and improved method of collective shooting in a cell, greatly reducing the processing complexity.

According to the embodiment, the encounter between a ray and object is projected by a visualization mechanism, in a sense similar to the human seeing, eliminating the need for a line/object mathematical intersection. This method replaces the expensive traversals of acceleration structure. As explained hereinafter, the visualization is done by means of the graphics GPU pipeline, resulting in high performance and low complexity.

In the following description it is assumed, that the scene is subdivided into cells, while each cell is processed autonomously. However, the collective shooting mechanism can be used as well as a stand alone version, when no cells involved.

The collective shooting is mathematically articulated as follows:

Let T be a tree-graph of d levels and let V be its vertices on top of geometries G in space.

Define $V_d$—vertices within V in level d.

Let $C_d$ be a division of $V_d$ to clusters.

We shall extend T to d+1 levels by finding $V_{d+1}$:

Choose cluster $c \in C_d$, with $V_{d_c}$ vertices and define $L_c$—set of mappings from $V_{d_c}$ to $V_{d+1_c}$ such that $V_{d+1_c}$ are projections of the vertices in $V_{d_c}$ on top of G.

$$V_{d+1} := \bigcup_c V_{d+1_c}$$

Note that $L_c$ is a set of mappings from the same input, so there can be several target vertices for any input vertex.

Instead of projecting every vertex $v \in V_{d_c}$ on every possible geometry $g \in G$ in $\theta(|\overline{L_c}| \cdot |V| \cdot |G|)$, we project every possible $g \in G$ on every cluster $c \in C_d$ in $\theta(|\overline{L_c}| \cdot (|V|+|G|))$.

In $R^3$ We can utilize traditional 3D graphics pipeline (raster hardware) to achieve fast mappings (projections) in parallel.

We optimize $C_d/L_c$ in throughput/overfitting to have:

Maximum number of vertices per cluster in average (throughput).

Minimum number of [discrete] projections of geometries fitting all vertices (overfitting).

Preprocess/Runtime constraints.

$L_c$ is chosen to have a pseudo-random output, representing a possible segment of distribution for each $v \in V_{d_c}$ to simulate a physical scenario.

Figure 7:
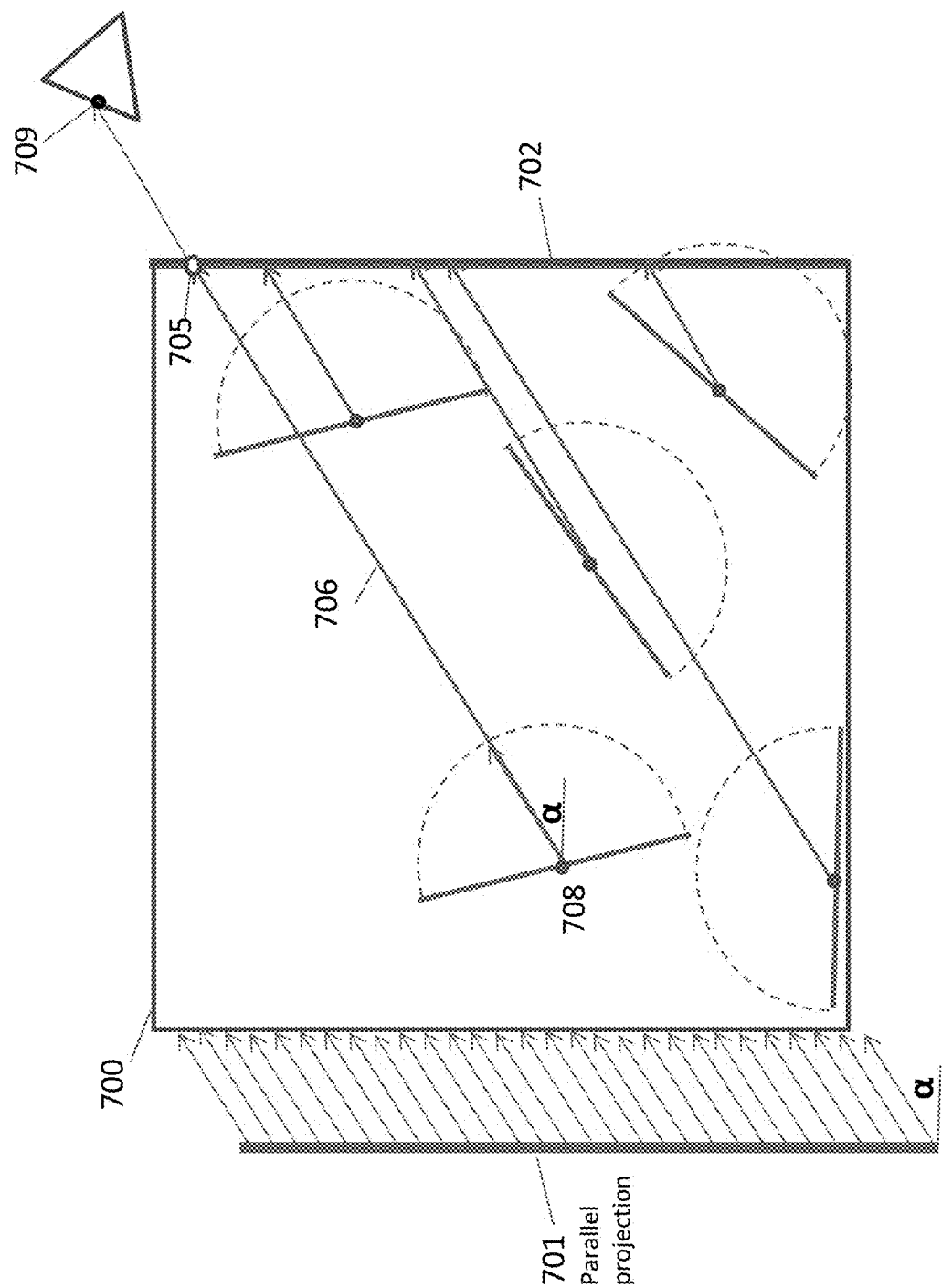

The input vertices V of the above articulation are illustrated in FIG. 7 as the primary HIPs, e.g. 708, each generating multiple target vertices $V_{d+1}$, e.g. 709. Several HIPs are shown in the cell 700. Following the global illumination principle, each HIP must shoot multiple hemi-rays in random directions within the hemisphere, in order to sufficiently sample the surroundings. In prior art each HIP is treated individually, while according to the embodiment, hemi-rays from all HIPs are generated and shot collectively, utilizing a graphics pipeline projection mechanism. The projection can be parallel, oblique, perspective or other. In the example given in FIG. 7 and hereinafter, a parallel projection is assumed 701. The view, taken from the parallel projection, is registered on a rendering target 702 as a texture. E.g. the radiance gained by the projected hemi-ray 706, shot as part of the parallel projection at angle α, and hitting an object at a hit point 709, is registered at fragment 705 of the render target. The same procedure is carried on to the next generations of HIPs: e.g. the new HIP 709 becomes a subject for the next generation of local collective shooting. A satisfactory number of repeating projections, each projection at a random direction, would have an equivalent effect to the prior art's individual treatments of all the HIPs in the cell.

Figure 8A:
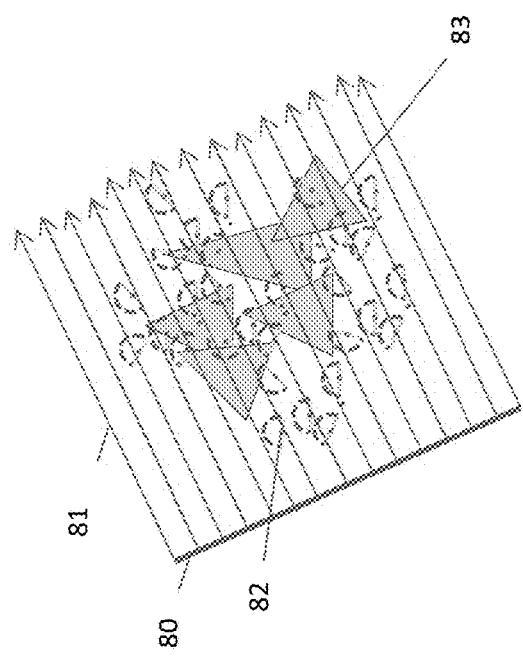
Figure 8C:
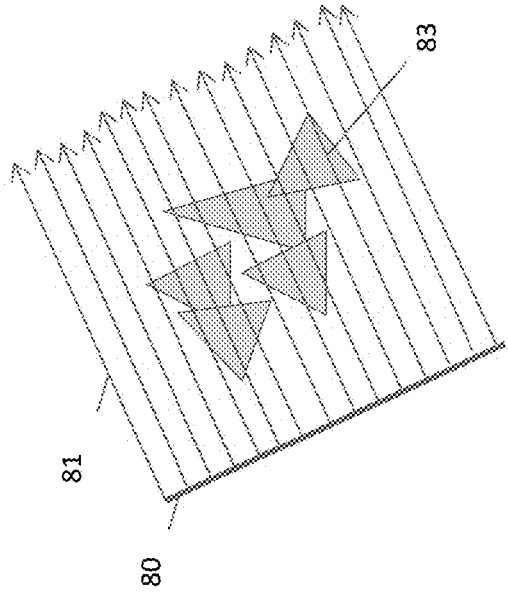
Figure 8B:
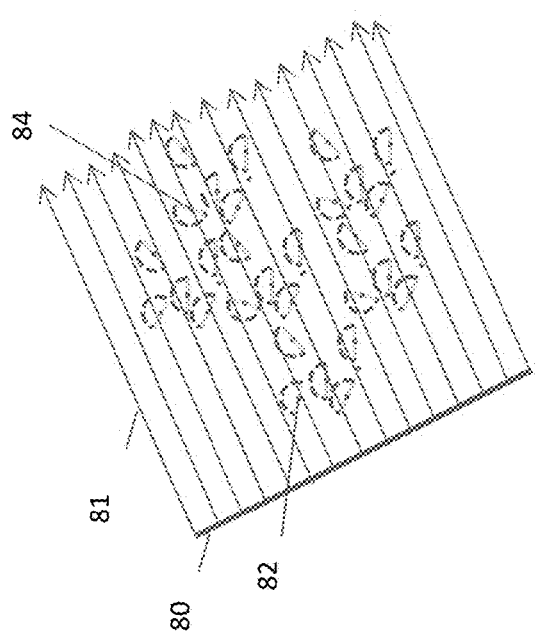

As explained hereinafter, the projecting mechanism must treat the HIPs separately from the geometry data. This is depicted in FIGS. 8a, 8b, and 8c. FIG. 8a, showing a parallel projection of a sub-scene, consisting of a projection plane 80, projection rays 81, HIPs 82 and geometric data (triangle) 83. The cell sub-space contains HIPs and geometric data of triangles, which are projected separately. In FIG. 8b only the HIPs are shown. Each single parallel projection is relevant only to those HIPs that are facing toward the projection, the 'active' HIPs, like 82, but not 84. For all relevant HIPs, or part thereof, a hemi-ray is generated in the projected direction. In FIG. 8c the geometric data of the sub-scene is shown. It is subject to a separate rendering, as described below.

The local collective shooting of the present invention utilizes the Z-buffering mechanism of a raster graphics. Each active HIP 'looks' forward along the direction of parallel projection. So the Z-buffering mechanism must discard objects all the way before the HIP, and start seeking objects only at the HIP. This is described in FIG. 9b. Triangle 95 that is located earlier than the HIP 91, is discarded. One embodiment of doing it is based on a selective use of the z-buffering mechanism of GPU, e.g. the function gIDepthMask of the OpenGL graphics library. The parallel projection is done in two separate rendering passes. In the first pass the HIPs only are rendered, to generate a HIP depth mask, as shown in FIG. 9a. The ray 92, that passes through HIP 91, is broken down into 2 segments. The first segment, termed early segment, extends from the projection plane 90 up to the depth point $Z_{HIP}$ at the HIP. This depth value $Z_{HIP}$ is registered in the HIP depth mask, to be used in the second pass, when the geometry data is rendered, in order to filter out the earlier segment. Only the hits of the main segment are considered, as shown in FIG. 9b. The geometric data is rendered into render target, utilizing the HIP Depth Mask. The depth value $Z_{HIP}$ is used to discard the segment between the projection plane 90 and the location of HIP 91. The triangle 95 turns invisible, because the functional rendering starts right after the HIP along the ray, which hits the triangle at fragment 93. Furthermore, rays that miss HIPs are entirely discarded, considered as early segments in their entirety. Once the projection is done, the hemi-ray/triangle hit can be found by inspecting the render target at the u, v coordinate.

Figure 10:
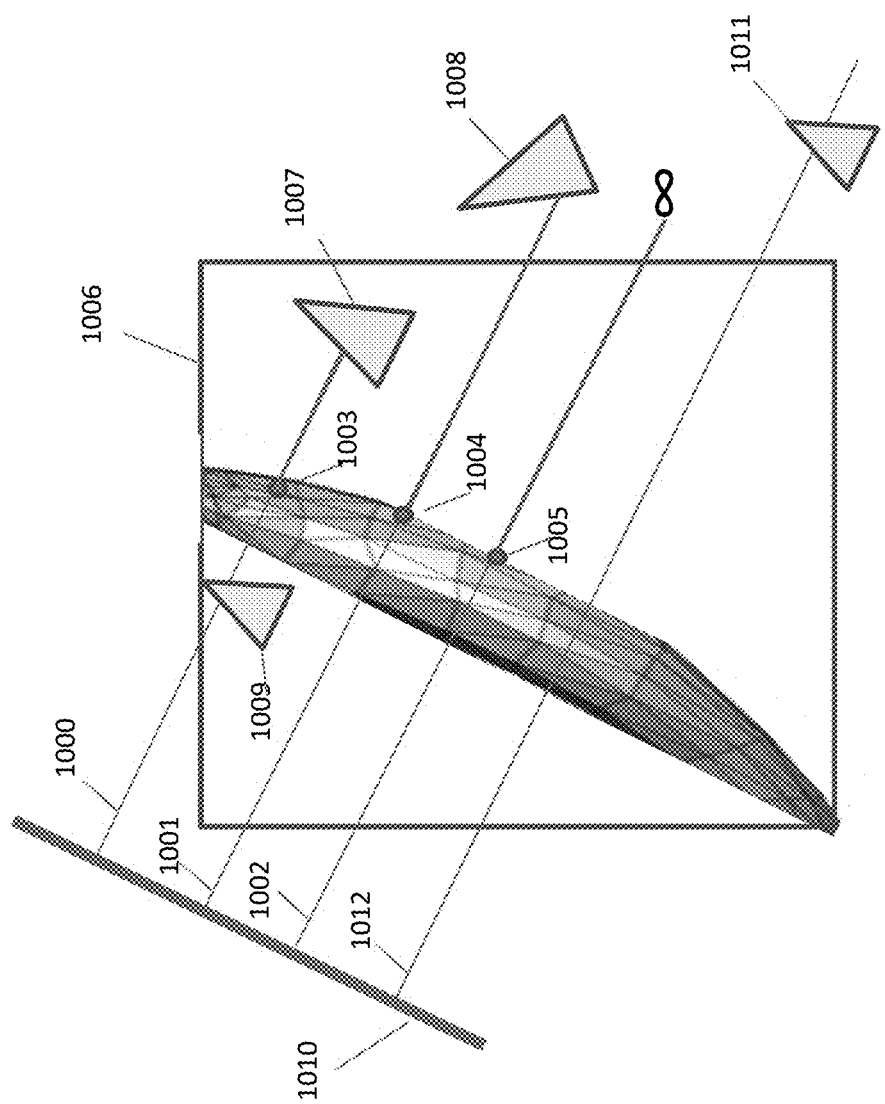

In FIG. 10 three different cases of projection rays are shown. They all pass through the sub-scene of the cell 1006, commencing at the projection plane 1010 and extending, through the cell, into entire scene space. Ray 1000 consists of two segments. The first segment, extending from the projection plane up to HIP 1003, is discarded from hitting objects. Objects encountered on the way of this segment become invisible, like triangle 1009. The 'functional' segment starts at the HIP 1003, and thereafter encountering the triangle 1007. This triangle, as being internal to the cell 1006, is recorded as a new HIP belonging to the cell. The 'functional' segment of ray 1001, starts at HIP 1004 and hits an external triangle 1008. The recording of this triangle is done in another cell. The third ray 1002 does not hit any object. Ray 1012 fails to pass through HIP. It remains in a 'non-functional' state, therefore objects, like triangle 1011, remain invisible. Only the 'interesting' fragments, extended from HIPs, are registered on the render target.

Figure 11:
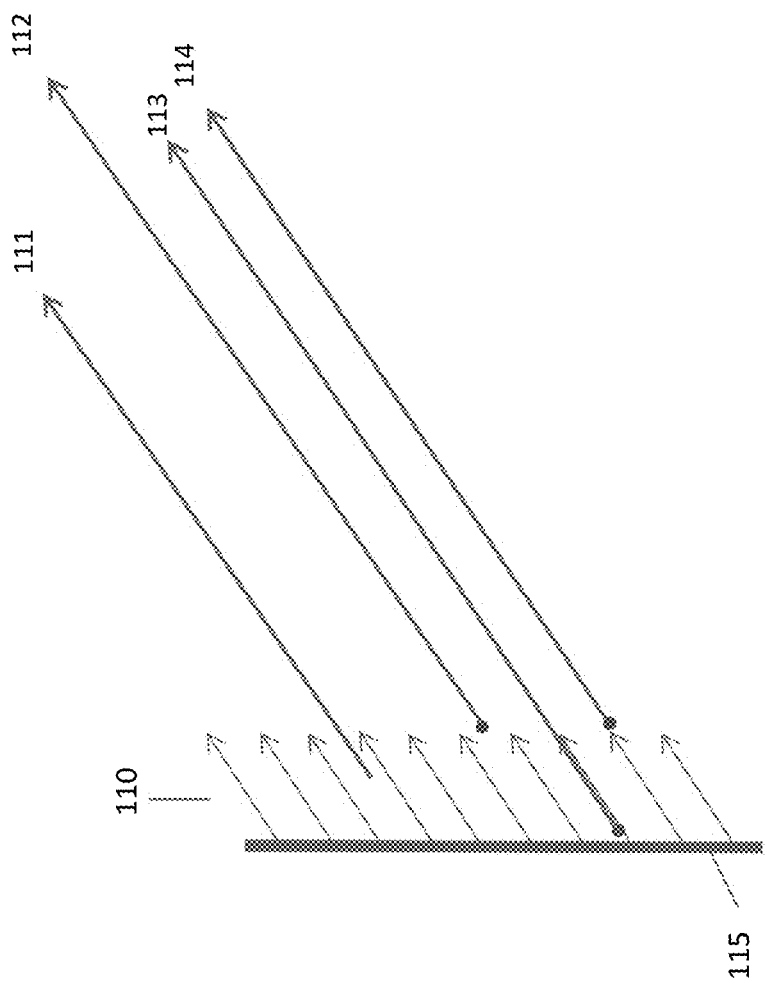

Accuracy: to what extent the hemi-ray and the parallel projection ray must overlap? The lack of accuracy is demonstrated in FIG. 11. The projected rays 110 and the hemi-rays mostly do not overlap 111-113. Hemi-ray 114 is the only one to accurately overlap a projected ray. Accuracy has two different aspects. The first is the gained radiance that is brought back to the HIP from the surrounding scene. If we allow some tolerance, then the closest projection ray would hit a target triangle at a close but not accurate location. The resulted radiance would be most likely close, or almost the same. The second aspect is the next generation ray, that extends the hemi-ray at a point of hit, bouncing farther into the scene. Here the accuracy is critical. A small initial slip can carry an intolerable error with few bouncing generations. In FIG. 11 only ray 114, as is, qualifies for the second aspect. However, the inaccurate cases can be corrected by conducting an intersection test, as explained hereinafter in detail.

Figure 12:
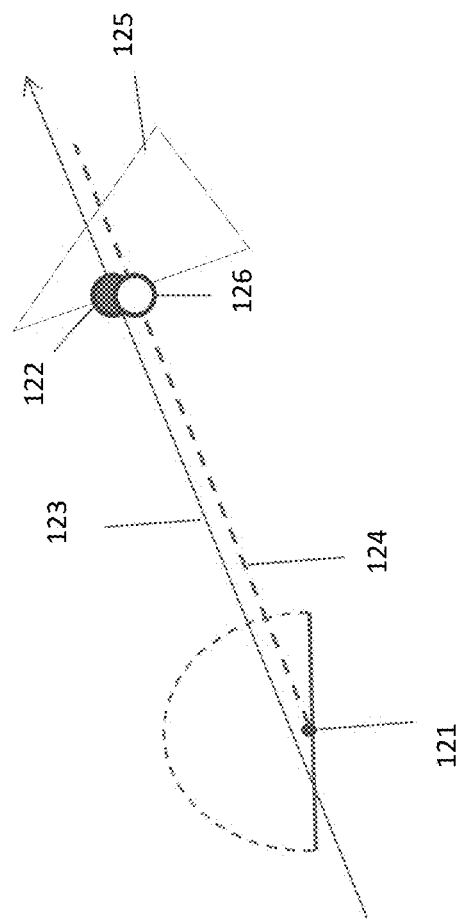

In FIG. 12, the projection ray 123 passes close to HIP 121, hitting the triangle 125 at fragment 122. However, since there is no overlapping between the projection ray 123 and the exact hemi-ray 124, the accurate point of hit 126 must be calculated. This can be done by performing an intersection test between the exact hemi-ray and the triangle. As mentioned above, accuracy is mandatory if many generations of HIPs are processed. E.g. at the point 126 a continuing hemi-ray must be generated. Alternatively, if the hit point is required for the sampled radiance only, then a lower accuracy may be still tolerable. In such a case, the radiance value is taken in fragment 122, avoiding intersection test.

Figure 13:
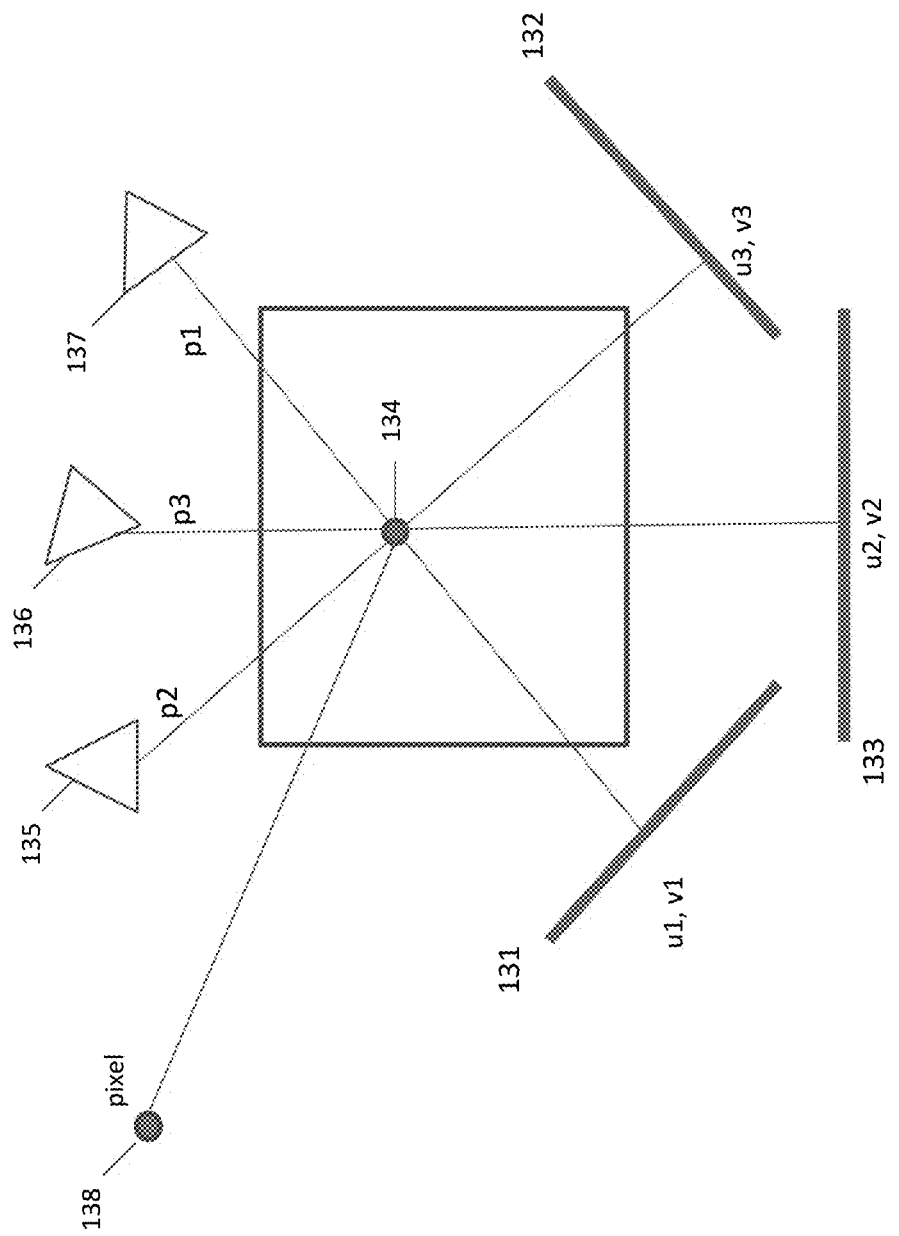

Multiple parallel projections at a cell, and their effect on a HIP 134, are shown in FIG. 13. The projection planes 131, 132, and 133, can be chosen randomly. Three different rays pass through the HIP, while each ray's 'functional' segment begins at the HIP. It is equivalent to three hemi-rays emitting from the HIP, within the hemisphere boundaries. The rays are marked p1, p2 and p3, identifying that they belong to projections 131, 132, 133 respectively. In the case shown, the rays hit three different objects, 137, 136 and 135, respectively, generating three newly created HIPs, and collecting 3 radiance values. The resulting radiance is passed to the pixel 138.

Figure 14:
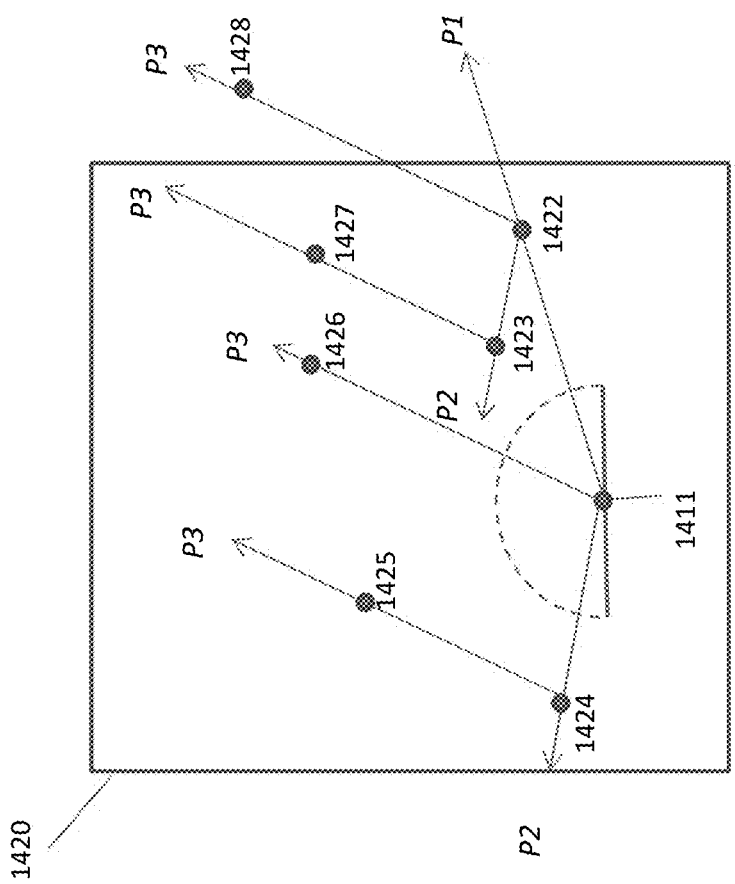

The next generations of rays and HIPs may be generated and used in different ways. According to one embodiment, use is made of all HIP's hemi-rays. This is shown in FIG. 14, where 3 successive projections are generated, creating new HIPs inside and outside the cell, up to the depth of 3. First, a single HIP of origin 1411 "shoots" a hemi-ray in P1 direction, creating a new HIP 1422. Next projection P2 creates two additional HIPs 1423 and 1424. Then projection P3 generates 4 additional HIPs 1425-1428. Some of the newly generated HIPs 1424 are internal to the cell, and some external, such as 1428. The reproduction rate of HIPs according to this embodiment is exponential, thus hard to control. E.g. another embodiment can use only one of HIP children to continue the generation.

In the collective shooting within a cell, the communication of rays reaching out of the cell, is still carried by the global acceleration structure. However, this communication is reduced due to two procedures: many rays conclude their tracing internally in the cell, and the traversal is simplified by knowing ahead the coordinate of the external intersection, found in the course of the projection. These events reduce the load on the global acceleration structure, as shown in the next two drawings.

Figure 15:
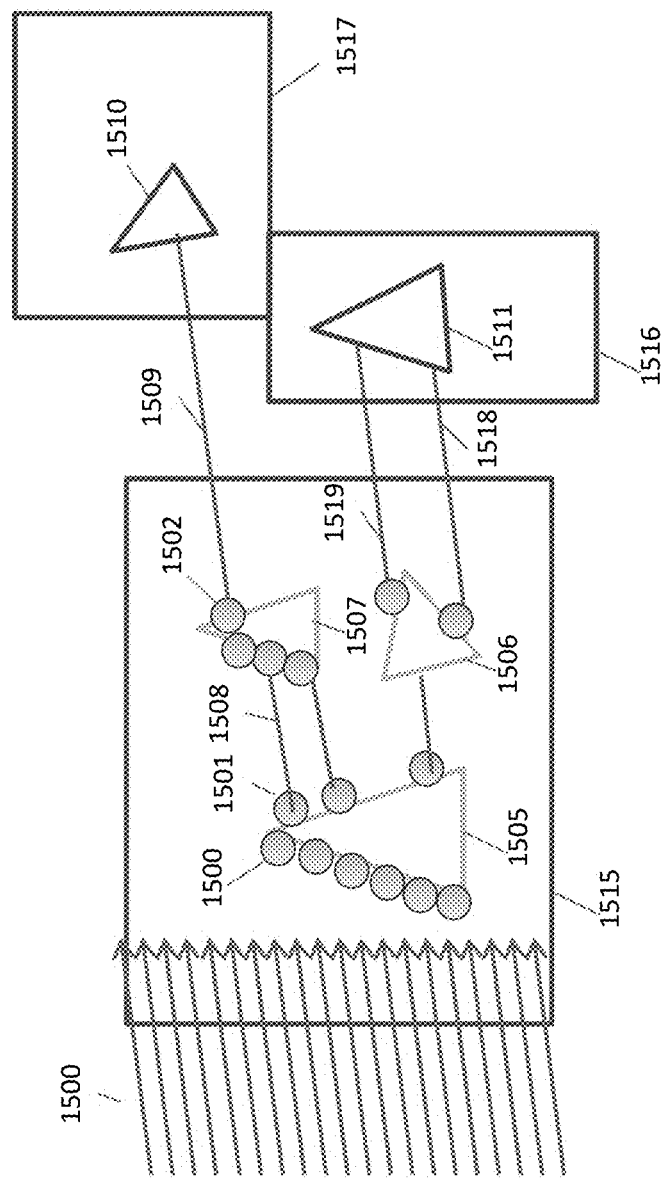

FIG. 15 pictures an exemplary cell 1515 with primary HIPs, e.g. 1500. We assume that all the HIPs in the scene are primary. Their response to the projection 1520 varies according to their relative position. The normal vector of HIP 1500 is heading the opposite direction, therefore it is inactive for this projection. The hemi-ray extended from HIP 1501 intersects a local object 1507, therefore it does not extend outside the cell, and does not need external services. The hemi-ray of HIP 1502, reaches outside the cell, ad must use the global acceleration structure to create a new HIP at the intersection point with the object 1510. In this example, half of the hemi-rays reach out of the cell.

Figure 16A:
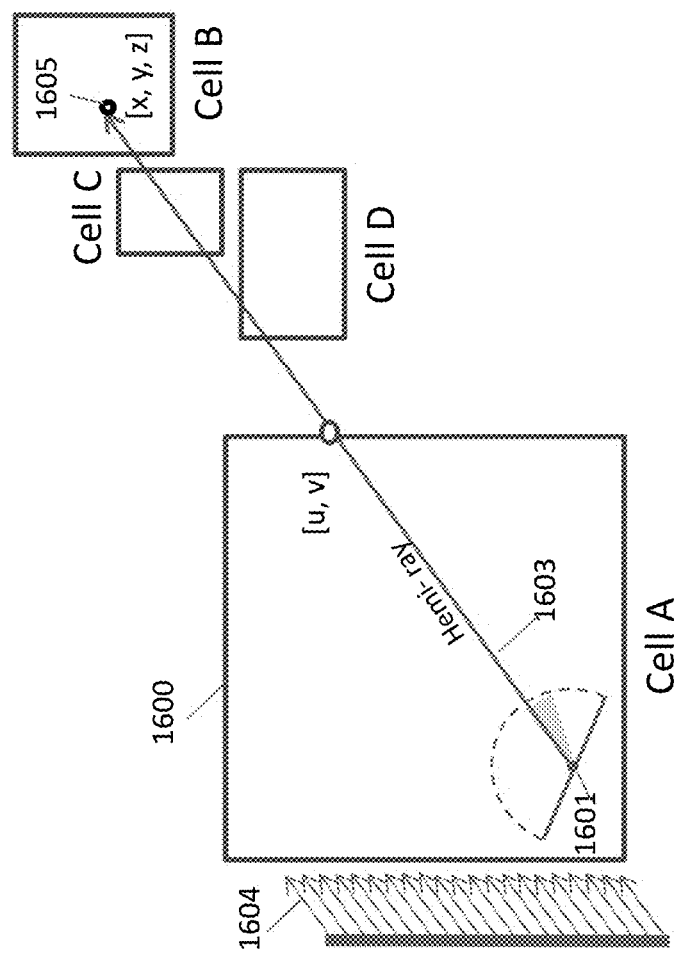
Figure 16B:
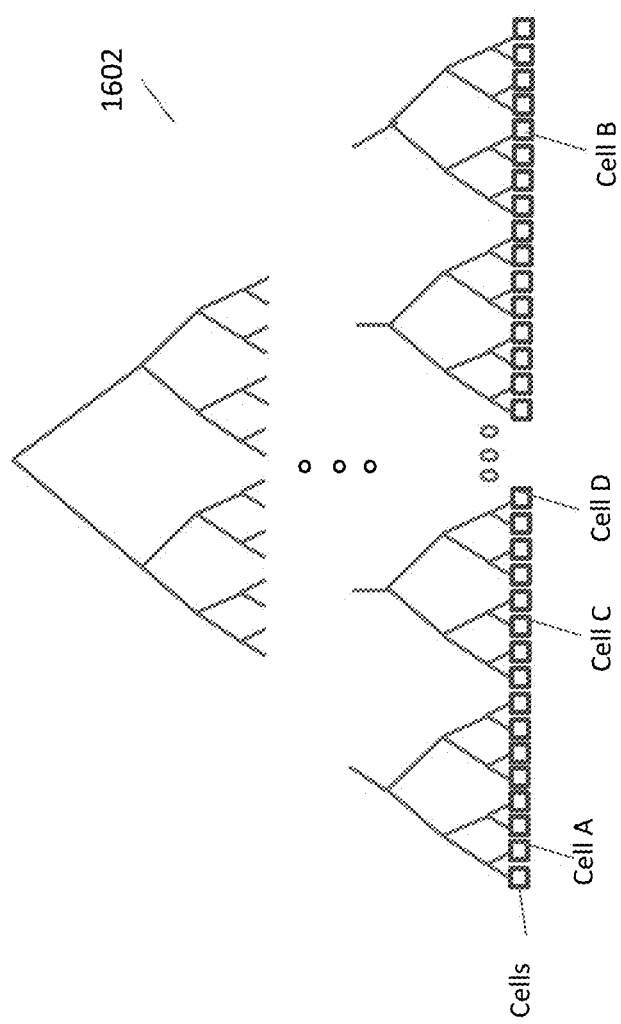

The reduced traversal complexity involved with the use of the global acceleration structure is described by FIG. 16*a* and FIG. 16*b*. As shown in FIG. 16*a* the primary HIP 1601 shoots a hemi-ray 1603 which hits an external object at coordinates [x,y,z]. This coordinate is easily calculated from the location [u,v] of the corresponding fragment. The cell is not known. Next step is to traverse the global acceleration structure for the cell holding this coordinate. Whereas, if the coordinates were not known, the traversal should include a visit in the intermediate cells of C and D.

Figure 17:
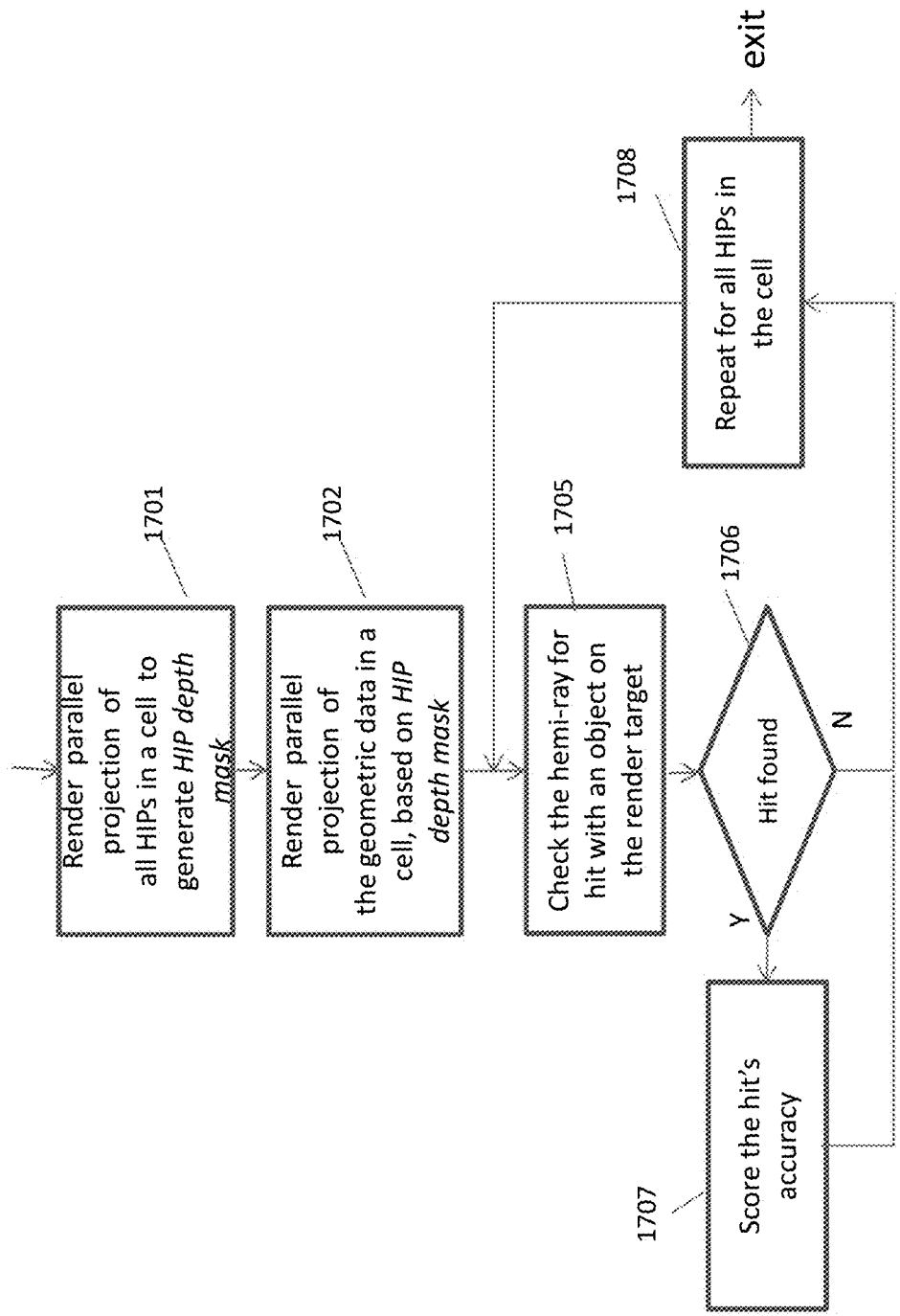

Flowchart. The preferred embodiment of the present invention is flowcharted in FIGS. 17 and 18. FIG. 17 describes a single projection-cycle, out of multiple projections in a cell. It is assumed that the cell is populated above some minimal number of HIPs. The parallel projection consists of two passes. The first pass 1701 generates a HIP depth mask. The HIP depths of the mask are utilized in the second pass to disable the insignificant early segments of rays. Rays that do not pass HIPs are entirely discarded. The second pass 1702 renders the geometric data, in reference to HIP depth mask, into the render target. Only triangles that are hit by the 'functional' segments of parallel rays, are candidates for a subsequent hit test.

The product of rendering, the render target, is used to find the hit point for each HIP, by inspecting the render target texture at the correct u,v coordinates 1706. If a hit is found, then the accuracy is checked 1707, as explained hereinbefore. The projection cycle is completed when all HIPs are checked for hit and for accuracy.

Figure 18:
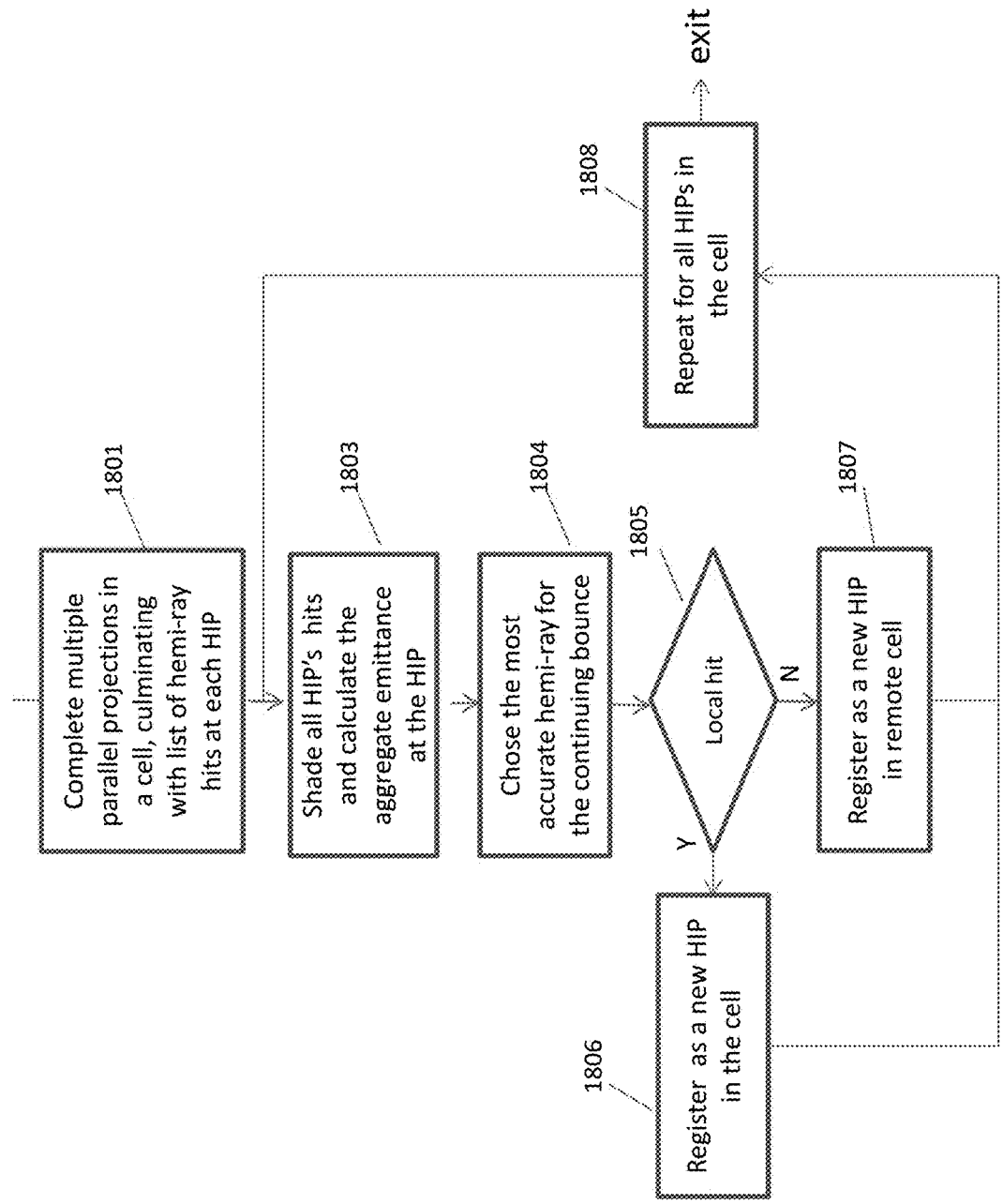

The preferred embodiment of a collective shooting in a cell is detailed in flow chart of FIG. 18. First, multiple parallel projections in a cell are done, each at random direction. This sequence of projections culminates with a list of multiple hemi-ray hits per each HIP 1801. Although, in this embodiment, only one hemi-ray per HIP is chosen to continue, nevertheless, all the hit points associated with a HIP are taken advantage of to calculate the accumulated emittance, for indirect illumination. From the multiple hits only the most accurate hemi-ray is chosen to continue the bouncing chain for a HIP 1804. Each hit is registered in the cell as a local one 1806, or in another cell if it falls out of the cell 1807. The bouncing sequence is completed when all HIPs are done 1808. When the cell processing is done, the cell turns inactive, and the processor/thread is assigned to another cell in a line. Each cell can turn active multiple times, according to the needs.

The invention claimed is:

1. A system of distributed acceleration structures for ray tracing, comprising:
a processor,
multiple graphics processors having a raster pipeline,
a computer memory, and
geometric data of a three-dimensional (3D) scene divided into multiple cells;
wherein for intersection tests between rays and the 3D scene;
   a) a global acceleration structure of multiple cells is constructed;
   b) a local acceleration structure for each cell is constructed;
   c) primary rays are generated by rendering the 3D scene with the raster pipeline;
   d) for each primary ray the global acceleration structure is traversed finding a cell of intersection; and
   e) a hit point is registered at the cell of intersection; and
for generating secondary hit points:
   a) at each cell secondary rays are created originating at each primary hit point; and
   b) at each cell the local acceleration structure is traversed by each secondary ray seeking for hits with local objects;
wherein in event of hit, radiance at the point of intersection is sampled, and diffuse radiance at ray's origin is calculated and registered; and wherein in event of no hit, the global acceleration structure is traversed seeking a next cell of hit for the ray.

2. The system of claim 1, wherein basic data elements of the local acceleration structures are triangles.

3. The system of claim 1, wherein data elements of local acceleration structures of a cell include triangles.

4. The system of claim 1, wherein the global acceleration structure resides centrally in the system, accessed by the primary rays as well as by part of the secondary rays of local cells.

5. The system of claim 1, wherein secondary rays that move between local and global structures, are configured to be rearranged in one or more packets.

6. The system of claim 1, wherein the system comprises multiple CPUs.

7. The system of claim 1, wherein the system comprises multiple graphics processors.

8. A method comprising:
for intersection tests between rays and a three-dimensional (3D) scene:
   constructing a global acceleration structure of multiple cells;
   constructing a local acceleration structure for each cell;
   generating primary rays are generated by rendering the 3D scene with a raster pipeline;
   finding a cell of intersection for each primary ray the global acceleration structure is traversed; and
   registering a hit point at the cell of intersection; and
for generating secondary hit points:
   creating at each cell secondary rays originating at each primary hit point; and
   seeking for hits with local objects at each cell the local acceleration structure is traversed by each secondary ray;
wherein in event of hit, radiance at the point of intersection is sampled, and diffuse radiance at ray's origin is calculated and registered; and wherein in event of no hit, the global acceleration structure is traversed seeking a next cell of hit for the ray.

9. The method of claim 8, wherein basic data elements of the local acceleration structures are triangles.

10. The method of claim 8, wherein data elements of local acceleration structures of a cell include triangles.

11. The method of claim 8, wherein the global acceleration structure resides centrally in a system, accessed by the primary rays as well as by part of the secondary rays of local cells.

12. The method of claim 8, wherein secondary rays that move between local and global structures, are configured to be rearranged in one or more packets.

13. The method of claim 8, wherein the method is implemented by a system comprising multiple CPUs.

14. The method of claim 8, wherein the method is implemented by multiple graphics processors.

15. A non-transitory computer readable medium comprising non-transitory computer readable instructions that, when executed by one or more processors, configures the one or more processors to perform operations comprising:
for intersection tests between rays and a three-dimensional (3D) scene:
   constructing a global acceleration structure of multiple cells;
   constructing a local acceleration structure for each cell;
   generating primary rays are generated by rendering the 3D scene with a raster pipeline;
   finding a cell of intersection for each primary ray the global acceleration structure is traversed; and
   registering a hit point at the cell of intersection; and
for generating secondary hit points:
   creating at each cell secondary rays originating at each primary hit point; and
   seeking for hits with local objects at each cell the local acceleration structure is traversed by each secondary ray;
wherein in event of hit, radiance at the point of intersection is sampled, and diffuse radiance at ray's origin is calculated and registered; and wherein in event of no hit, the global acceleration structure is traversed seeking a next cell of hit for the ray.

16. The non-transitory computer readable medium of claim 15, wherein basic data elements of the local acceleration structures are triangles.

17. The non-transitory computer readable medium of claim 15, wherein data elements of local acceleration structures of a cell include triangles.

18. The non-transitory computer readable medium of claim 15, wherein the global acceleration structure resides centrally in a system, accessed by the primary rays as well as by part of the secondary rays of local cells.

19. The non-transitory computer readable medium of claim 15, wherein secondary rays that move between local and global structures, are configured to be rearranged in one or more packets.

20. The non-transitory computer readable medium of claim 15, wherein the one or more processors comprise multiple CPUs or multiple graphics processors.

* * * * *